(12) United States Patent
Subrahmanyam et al.

(10) Patent No.: US 7,693,124 B2
(45) Date of Patent: Apr. 6, 2010

(54) SLOT-TO-INTERLACE AND INTERLACE-TO-SLOT CONVERTERS FOR AN OFDM SYSTEM

(75) Inventors: Jai N. Subrahmanyam, San Diego, CA (US); Kevin Stuart Cousineau, Ramona, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 11/133,089

(22) Filed: May 18, 2005

(65) Prior Publication Data

US 2006/0002362 A1 Jan. 5, 2006

Related U.S. Application Data

(60) Provisional application No. 60/572,452, filed on May 18, 2004.

(51) Int. Cl.
*G06F 15/16* (2006.01)
(52) U.S. Cl. ...................... 370/343; 370/345
(58) Field of Classification Search ................ 370/523, 370/539, 543, 343, 345
See application file for complete search history.

(56) References Cited

U.S. PATENT DOCUMENTS

| | | | |
|---|---|---|---|
| 4,807,221 A | 2/1989 | Stummer | |
| 5,995,147 A | 11/1999 | Suzuki | |
| 6,545,997 B1 | 4/2003 | Bohnke et al. | |
| 7,221,645 B2 | 5/2007 | Wang et al. | |
| 7,221,680 B2 | 5/2007 | Vijayan et al. | |
| 7,397,838 B2 | 7/2008 | Laroia et al. | |
| 2004/0025120 A1* | 2/2004 | Sako | 716/3 |
| 2004/0114552 A1* | 6/2004 | Lim et al. | 370/324 |
| 2005/0058089 A1* | 3/2005 | Vijayan et al. | 370/312 |

FOREIGN PATENT DOCUMENTS

| | | |
|---|---|---|
| EP | 1170897 A1 | 5/2000 |
| EP | 1148673 A2 | 9/2001 |

(Continued)

OTHER PUBLICATIONS

International Preliminary Report on Patentability—PCT/US05/17460, IPEA/US- May 21, 2008.

(Continued)

*Primary Examiner*—Sam Bhattacharya
(74) *Attorney, Agent, or Firm*—Gerald P. Joyce, III

(57) ABSTRACT

In an OFDM system, multiple (M) interlaces are defined for M non-overlapping sets of frequency subbands, and M slots with fixed indices are also defined. Data streams and pilot are mapped to slots, which are in turn mapped to interlaces based on a slot-to-interlace mapping scheme that can achieve frequency diversity and good performance for all slots. At a transmitter, a slot-to-interlace converter maps the slots to the interlaces. The slot-to-interlace converter includes multiple multiplexers and a control unit. The multiplexers map the M slots to the M interlaces based on the slot-to-interlace mapping scheme. The control unit generates at least one control signal for the multiplexers. The multiplexers may be arranged and controlled in various manners depending on the slot-to-interlace mapping scheme. At a receiver, a complementary interlace-to-slot converter maps the interlaces to the slots.

45 Claims, 16 Drawing Sheets

FOREIGN PATENT DOCUMENTS

| | | |
|---|---|---|
| JP | 2002-111631 | 4/2002 |
| JP | 2006-507754 | 3/2006 |
| JP | 2007-507921 | 3/2007 |
| JP | 2007-525102 | 8/2007 |
| WO | 02049306 | 6/2002 |
| WO | 02087104 | 10/2002 |
| WO | WO 2005/041515 A1 | 6/2005 |

OTHER PUBLICATIONS

International Search Report—PCT/US05/017460—ISA/EPO—Aug. 26, 2005.
Written Opinion—PCT/US05/017460—ISA/EPO—Aug. 26, 2005.
Fujita, et al., "Basic Transmission Performance of BDMA System", IEICE Technical Report, Japan, The Institute of Electronics, Information and Communication Engineers, Apr. 2, 1999, vol. 99, No. 19, p. 7-12, RCS99-2.

* cited by examiner

SLOT-TO-INTERLACE AND INTERLACE-TO-SLOT CONVERTERS FOR AN OFDM SYSTEM

This application claims the benefit of provisional U.S. Application Ser. No. 60/572,452, entitled "Slot to Interlace Conversion Architecture for OFDM Systems," filed May 18, 2004.

BACKGROUND

I. Field

The present disclosure relates generally to communication, and more specifically to techniques for multiplexing data and pilot in a communication system.

II. Background

An orthogonal frequency division multiplexing (OFDM) communication system utilizes OFDM for data and pilot transmission. OFDM is a multi-carrier modulation technique that partitions the overall system bandwidth into multiple (K) orthogonal frequency subbands. These subbands are also called tones, carriers, subcarriers, bins, and frequency channels. With OFDM, each subband is associated with a respective subcarrier that may be modulated with data.

A base station in the OFDM system may transmit multiple data streams simultaneously to wireless devices. These data streams may be continuous or bursty in nature, may have fixed or variable data rates, and may use the same or different coding and modulation schemes. The base station may also transmit a pilot to assist the wireless devices perform a number of functions such as time synchronization, frequency tracking, channel estimation, and so on. A pilot is a transmission that is known a priori by both a transmitter and a receiver.

Multiplexing multiple data streams for simultaneous transmission may be challenging if these data streams are variable in nature, e.g., have data rates and/or coding and modulation schemes that change over time. The multiplexing should be such that the data streams (1) can be allocated transmission resources in sufficiently small units to reduce excess capacity and (2) can achieve frequency diversity and good performance. The pilot should be multiplexed such that good channel estimates can be obtained in different channel environments. The channel estimates are used for data detection and decoding by the wireless devices and have direct impact on performance.

There is therefore a need in the art for techniques to multiplex data and pilot in an OFDM system.

SUMMARY

Techniques for multiplexing data and pilot in an OFDM system are described herein. Multiple (M) interlaces are defined for M non-overlapping sets of frequency subbands formed with OFDM. M slots are also defined and may be viewed as assignable transmission units. Data streams and pilot may be mapped to slots, which are assigned fixed indices. The slots are then mapped to the interlaces based on a slot-to-interlace mapping scheme that can achieve frequency diversity and good channel estimation and detection performance for all slots.

At a transmitter (e.g., a base station), a slot-to-interlace converter (SIC) maps the slots to the interlaces. In an embodiment, the slot-to-interlace converter includes multiple multiplexers and a control unit. The multiplexers map the M slots to the M interlaces based on the slot-to-interlace mapping scheme. The control unit generates at least one control signal for the multiplexers. The multiplexers may be arranged and controlled in various manners depending on the slot-to-interlace mapping scheme. For example, the multiplexers may be arranged in one or multiple stages, the slots may be provided to the multiplexers in permutated or linear order, common or individual control signals may be provided to the multiplexers, and so on. The slot-to-interlace converter may pass data and pilot symbols from slots to interlaces or may generate the controls used to pass these data and pilot symbols, as described below.

At a receiver (e.g., a wireless device), an interlace-to-slot converter maps the interlaces to slots. In an embodiment, the interlace-to-slot converter includes multiple multiplexers and a control unit. The multiplexers maps the interlaces to the slots based on the slot-to-interlace mapping scheme used by the transmitter. The control unit generates at least one control signal for the multiplexers. The multiplexers may also be arranged and controlled in various manners depending on the slot-to-interlace mapping scheme.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Data and pilot may be transmitted in various manners in an OFDM system. Each data stream should be transmitted across the entire system bandwidth to achieve frequency diversity. Pilot should also be transmitted across the entire system bandwidth to allow the wireless devices to estimate the channel frequency response for the entire system bandwidth.

Figure 1:
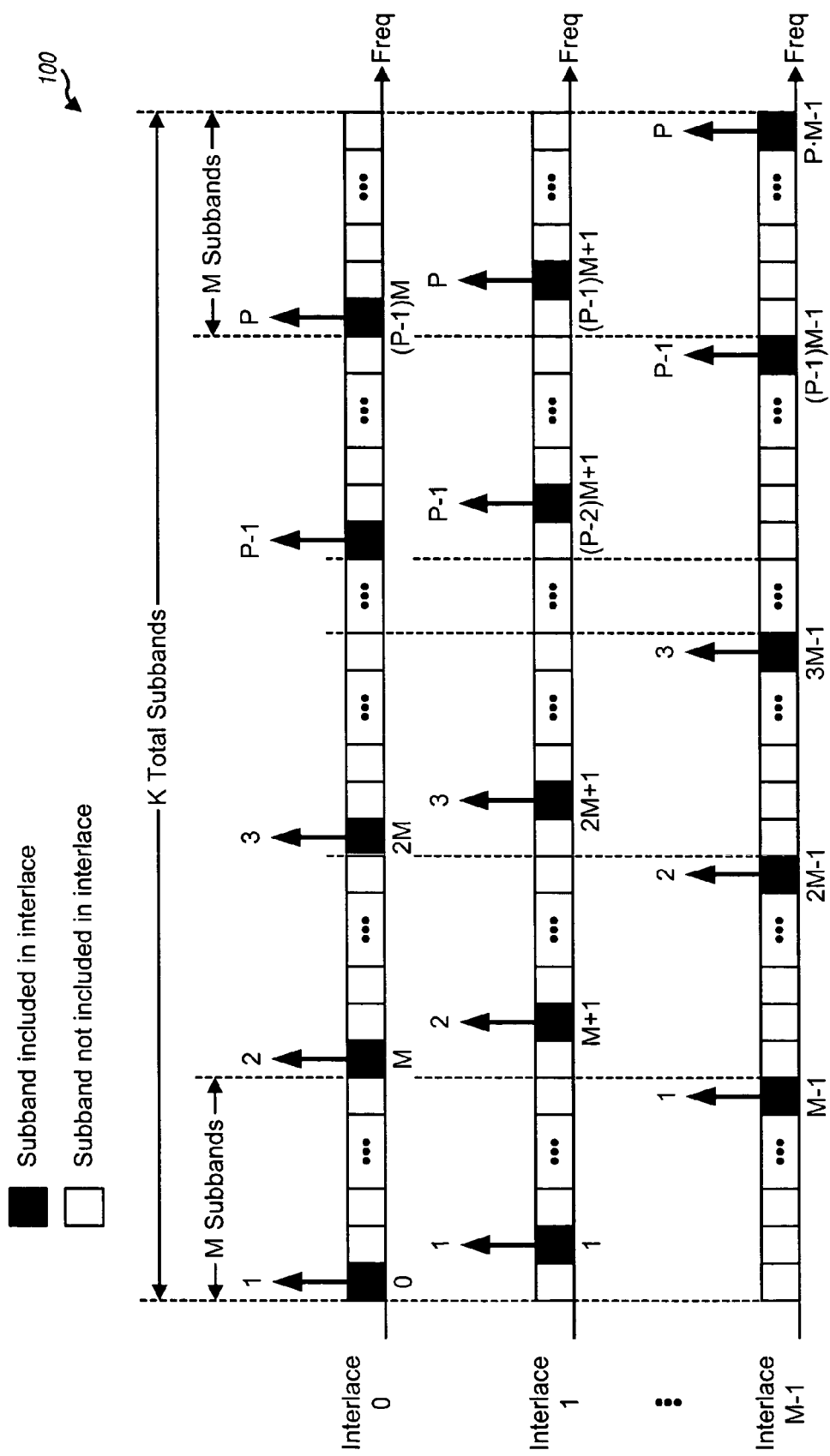
FIG. 1 shows an interlace subband structure for an OFDM system.

FIG. 1 shows an interlace subband structure 100 that may be used in an OFDM system. The system utilizes an OFDM structure having K total subbands, where K>1. U subbands may be used for data and pilot transmission and are called usable subbands, where U≦K. The remaining G subbands are not used and are called guard subbands, where G=K−U. As an example, the system may utilize an OFDM structure with K=4096 total subbands, U=4000 usable subbands, and G=96 guard subbands. For simplicity, the following description assumes that all K total subbands are usable and are assigned indices of 0 through K−1, so that U=K and G=0.

The K total subbands may be arranged into M interlaces or non-overlapping subband sets. The M interlaces are non-overlapping or disjoint in that each of the K total subbands belongs to only one interlace. Each interlace contains P subbands, where P=K/M. The P subbands in each interlace may be uniformly distributed across the K total subbands such that consecutive subbands in the interlace are spaced apart by M subbands. For example, interlace 0 may contain subbands 0, M, 2M, and so on, interlace 1 may contain subbands 1, M+1, 2M+1, and so on, and interlace M−1 may contain subbands M−1, 2M−1, 3M−1, and so on. For the exemplary OFDM structure described above with K=4096, M=8 interlaces may be formed, and each interlace may contain P=512 subbands that are evenly spaced apart by eight subbands. The P subbands in each interlace are thus interlaced with the P subbands in each of the other M−1 interlaces.

In general, the system may utilize any OFDM structure with any number of total, usable, and guard subbands. Any number of interlaces may also be formed. Each interlace may contain any number of subbands and any one of the K total subbands. The interlaces may contain the same or different numbers of subbands. For simplicity, much of the following description is for interlace subband structure 100 in FIG. 1 with M interlaces and each interlace containing P uniformly distributed subbands. This subband structure provides several advantages. First, frequency diversity is achieved since each interlace contains subbands taken from across the entire system bandwidth. Second, a wireless device can recover data or pilot sent on a given interlace by performing a partial P-point fast Fourier transform (FFT) instead of a full K-point FFT, which can simplify the processing at the wireless device.

A base station may transmit a frequency division multiplexed (FDM) pilot on one or more interlaces to allow the wireless devices to perform various functions such as channel estimation, frequency tracking, time tracking, and so on. The pilot is made up modulation symbols that are known a priori by both the base station and the wireless devices, which are also called pilot symbols. A wireless device can estimate the frequency response of a wireless channel based on the received pilot symbols and the known transmitted pilot symbols. The wireless device is able to sample the frequency spectrum of the wireless channel at each subband used for pilot transmission.

The pilot may be transmitted in a manner to ensure good channel estimation and detection performance in various channel environments. If the pilot is transmitted on one interlace, then a wireless device can estimate the channel frequency response for the P subbands in that interlace. The wireless device may then perform a P-point inverse FFT (IFFT) on the channel frequency response estimate to obtain a channel impulse response estimate with P taps. The wireless device may use the P-tap channel impulse response estimate for data detection to recover data symbols transmitted by the base station. A data symbol is a modulation symbol for data.

The length of the channel impulse response estimate determines the amount of delay spread that may be mitigated by a wireless device. The delay spread of a wireless channel is the time span or duration of an impulse response for the wireless channel. This delay spread is also the difference between the earliest and latest arriving signal instances (or multipaths) at the wireless device for a signal transmitted via the wireless channel by the base station. P is typically selected based on the expected delay spread in the system. Excess delay spread occurs when the actual channel impulse response is longer than P taps. Excess delay spread may be addressed by transmitting the pilot on multiple interlaces, which then allows the wireless device to sample the frequency spectrum at more subbands and hence derive a channel impulse response estimate that is longer than P taps. To limit the amount of system resources used for pilot transmission while still allowing the wireless device to derive a longer channel impulse response estimate, the pilot may be transmitted on one interlace in each symbol period but on different interlaces in different symbol periods. A symbol period is the duration of one OFDM symbol and is also called an OFDM symbol period.

Figure 2A:
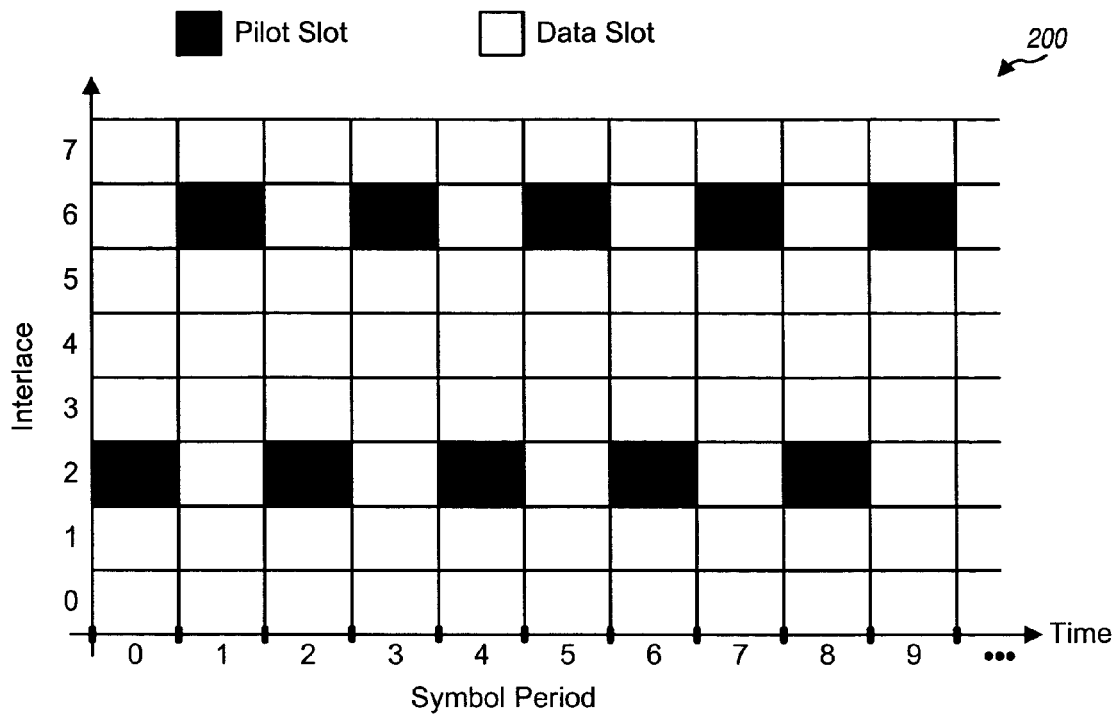
FIGS. 2A and 2B show two exemplary data and pilot transmission schemes.

FIG. 2A shows a data and pilot transmission scheme 200 with a staggered pilot. In this example, M=8, one interlace is used for pilot in each symbol period, and the remaining seven interlaces are used for data. An interlace used for pilot is called a pilot interlace, and an interlace used for data is called a data interlace. For transmission scheme 200, the pilot is sent on two designated interlaces 2 and 6 in an alternating manner such that pilot symbols are sent on interlace 2 in even-numbered symbol periods and on interlace 6 in odd-numbered symbol periods. The two interlaces used for the pilot are staggered or separated by M/2=4 interlaces. This staggering allows the wireless devices to observe the channel frequency response for more subbands, which may improve channel estimation and detection performance.

The specific interlace to use for pilot transmission (i.e., the pilot interlace) in each symbol period may be selected based on a pilot staggering pattern. Various staggering patterns may be used for pilot transmission. In one class of staggering patterns, the pilot interlace for each symbol period may be selected as follows:

$$m(t)=[m(t-1)+\Delta m] \bmod M, \text{ with } (\Delta m, M)=1, \quad \text{Eq (1)}$$

where $\Delta m$ is the difference between pilot interlaces for two consecutive symbol periods;

$m(t)$ is the pilot interlace for symbol period t;

mod denotes a modulo operation; and $(x, y)=1$ means that x and y are relatively prime (i.e., the greatest common divisor for both x and y is one).

Different "complete" staggering patterns may be formed with different values of $\Delta m$. A complete staggering pattern is one that selects all M interlaces for pilot transmission, e.g., in M symbol periods. As an example, with $\Delta m=1$, the M interlaces are selected in sequential order, and the staggering pattern may be denoted as $\{0, 1, 2, \ldots, M-1\}$. For the case with M=8, values of 1, 3, 5, and 7 may be used for $\Delta m$ to obtain different complete staggering patterns.

Figure 2B:
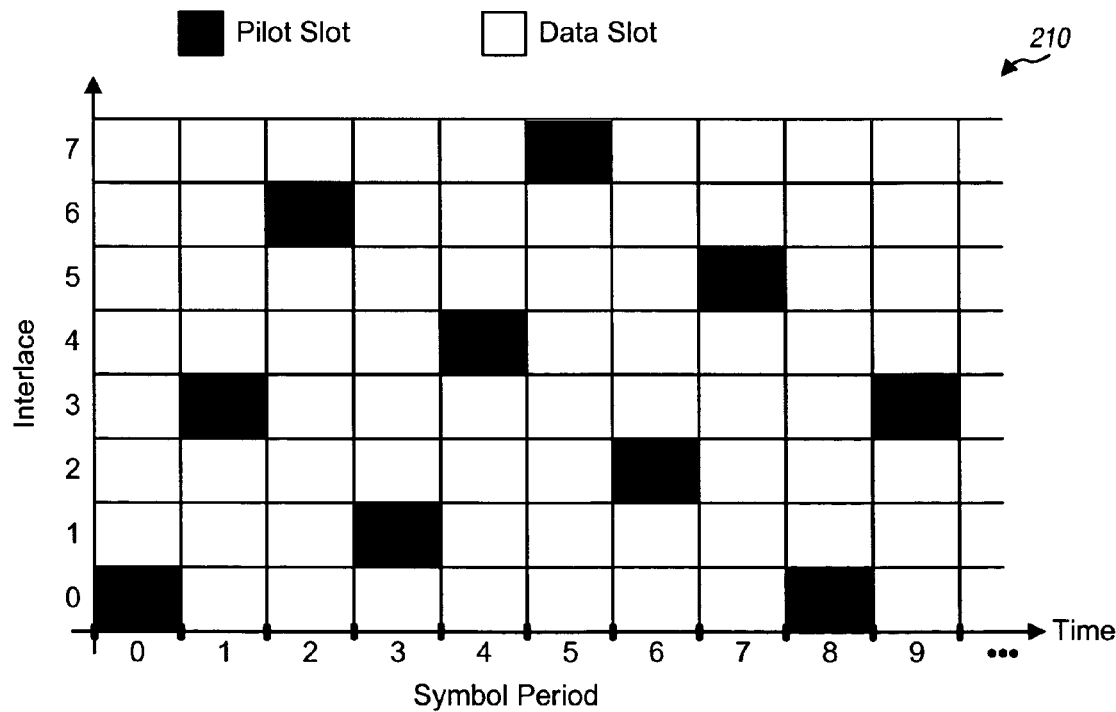

FIG. 2B shows a data and pilot transmission scheme 210 with a completely staggered pilot. In this example, M=8, one interlace is used for pilot in each symbol period, and the remaining seven interlaces are used for data. For transmission scheme 210, the pilot is sent on all eight interlaces using a staggering pattern of $\{0, 3, 6, 1, 4, 7, 2, 5\}$, which is generated with $\Delta m=3$ and M=8 in equation (1). Pilot symbols are sent on all eight interlaces in each 8-symbol period interval. This complete staggering pattern allows the wireless devices to estimate the channel frequency response for all K subbands.

In general, a pilot may be sent on any number of interlaces and on any one of the M interlaces in each symbol period. The pilot may also be sent using any staggering pattern. Two exemplary staggering patterns are shown in FIGS. 2A and 2B, and other staggering patterns may also be used. Transmitting the pilot on more than one interlace allows the wireless devices to derive longer channel impulse response estimates, which may be used to combat excess delay spread.

The base station may transmit multiple (T) data streams on the M interlaces in various manners. To achieve frequency diversity, the base station may transmit each data stream on different interlaces in different symbol periods in which the data stream is sent. To average out channel estimation and detection performance for all data streams, the base station may transmit each data stream on interlaces with varying distances to the pilot interlaces. A wireless device may derive a channel estimate for a data interlace based on a pilot received on a pilot interlace and may use the channel estimate for data detection. The quality of the channel estimate is dependent on the distance between the data interlace and the pilot interlace. The amount of degradation in detection performance is dependent on the channel estimate quality. The channel estimate quality is best and the performance degradation is least for the data interlaces that are adjacent to the pilot interlace. The converse is true for the data interlace that is farthest from the pilot interlace. Transmitting each data stream on interlaces with varying distances to the pilot interlace can average out the performance degradation due to channel estimation bias.

M slots may be defined to facilitate the mapping of data streams to interlaces. Each slot may be viewed as a transmission unit or a mean for sending data or pilot. A slot used for data is called a data slot, and a slot used for pilot is called a pilot slot. The M slots may be assigned indices 0 through M−1. Slot 0 may be used for pilot, and slots 1 through M−1 may be used for data. The data streams may be sent on slots 1 through M−1. The use of slots with fixed indices can simplify the allocation of slots to data streams. Each slot may be mapped to one interlace in one time interval. The M slots may be mapped to different ones of the M interlaces in different time intervals based on any slot-to-interlace mapping scheme that can achieve frequency diversity and good channel estimation and detection performance. In general, a time interval may span one or multiple symbol periods. The following description assumes that a time interval spans one symbol period.

Various slot-to-interlace mapping schemes may be used to map the M slots to the M interlaces. A first slot-to-interlace mapping scheme suitable for transmission scheme 200 in FIG. 2A may be implemented as follows. The eight interlaces are represented by an original sequence of $\{I_0, I_1, I_2, I_3, I_4, I_5, I_6, I_7\}$. A permutated sequence of $\{I_0, I_4, I_2, I_6, I_1, I_5, I_3, I_7\}$ is formed by placing each interlace in the original sequence in the bit-reverse location in the permutated sequence. A shortened sequence of $\{I_0, I_4, I_{2/6}, I_1, I_5, I_3, I_7\}$ is then formed by combining the two interlaces used for pilot. The pilot is transmitted on either interlace 2 or 6 in each symbol period, as shown in FIG. 2. Data is transmitted on the interlace that is not used for the pilot, which is either interlace 6 or 2 and is denoted as $I_{2/6}$ in the shortened sequence. Data slot m for m∈ $\{1 \ldots 7\}$ is then mapped to the m-th interlace in the shortened sequence. For each symbol period thereafter, the shortened sequence is circularly shifted to the right by two positions and wraps around to the left. Data slot m is again mapped to the m-th interlace in the circularly shifted shortened sequence.

Figure 3:
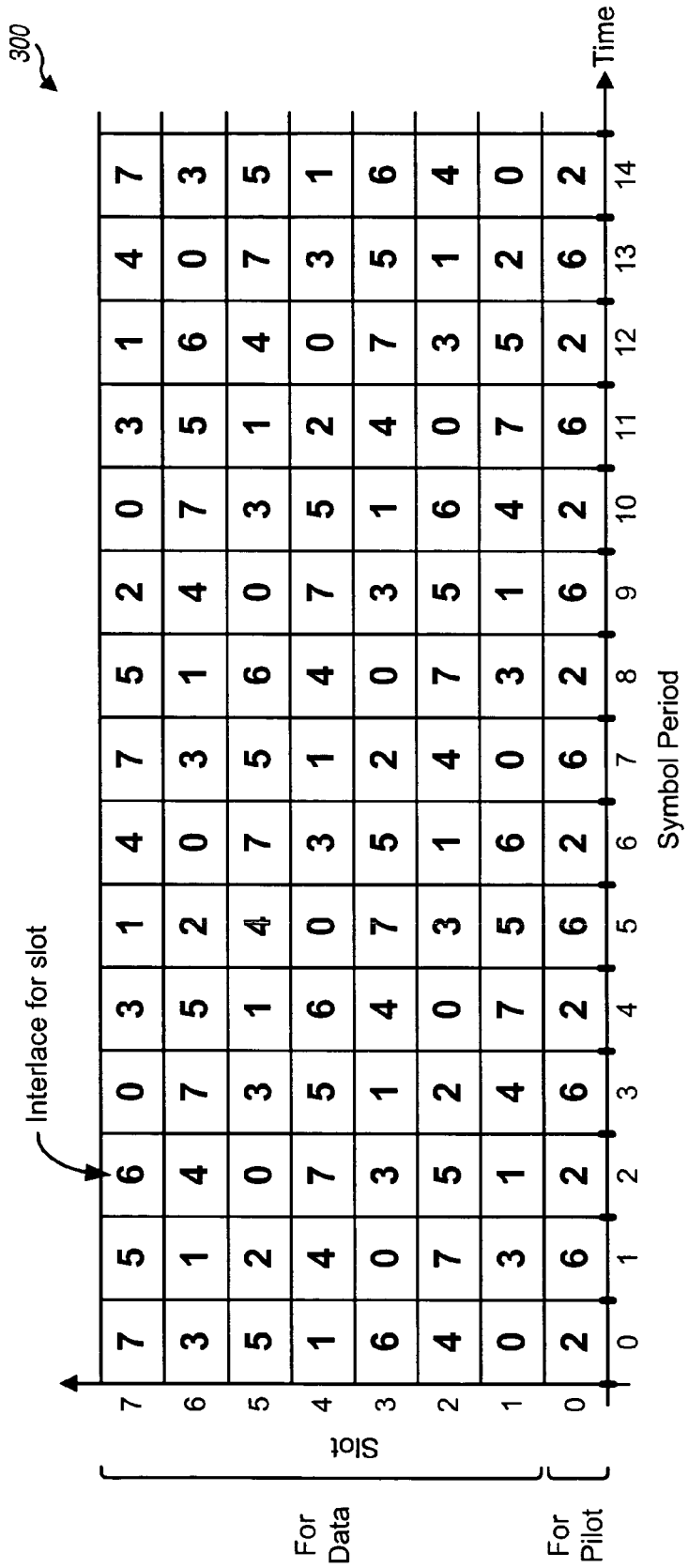
FIG. 3 shows a first slot-to-interlace mapping scheme.

FIG. 3 shows a mapping 300 of slots to interlaces for the first slot-to-interlace mapping scheme described above. Pilot slot 0 is mapped to interlaces 2 and 6 on alternating symbol periods for transmission scheme 200. Data slots 1 through 7 are mapped to the seven interlaces in the shortened sequence $\{I_0, I_4, I_{2/6}, I_1, I_5, I_3, I_7\}$ in the first symbol period, then to the circularly shifted shortened sequence $\{I_3, I_7, I_0, I_4, I_{2/6}, I_1, I_5\}$ in the second symbol period, and so on.

Figure 4:
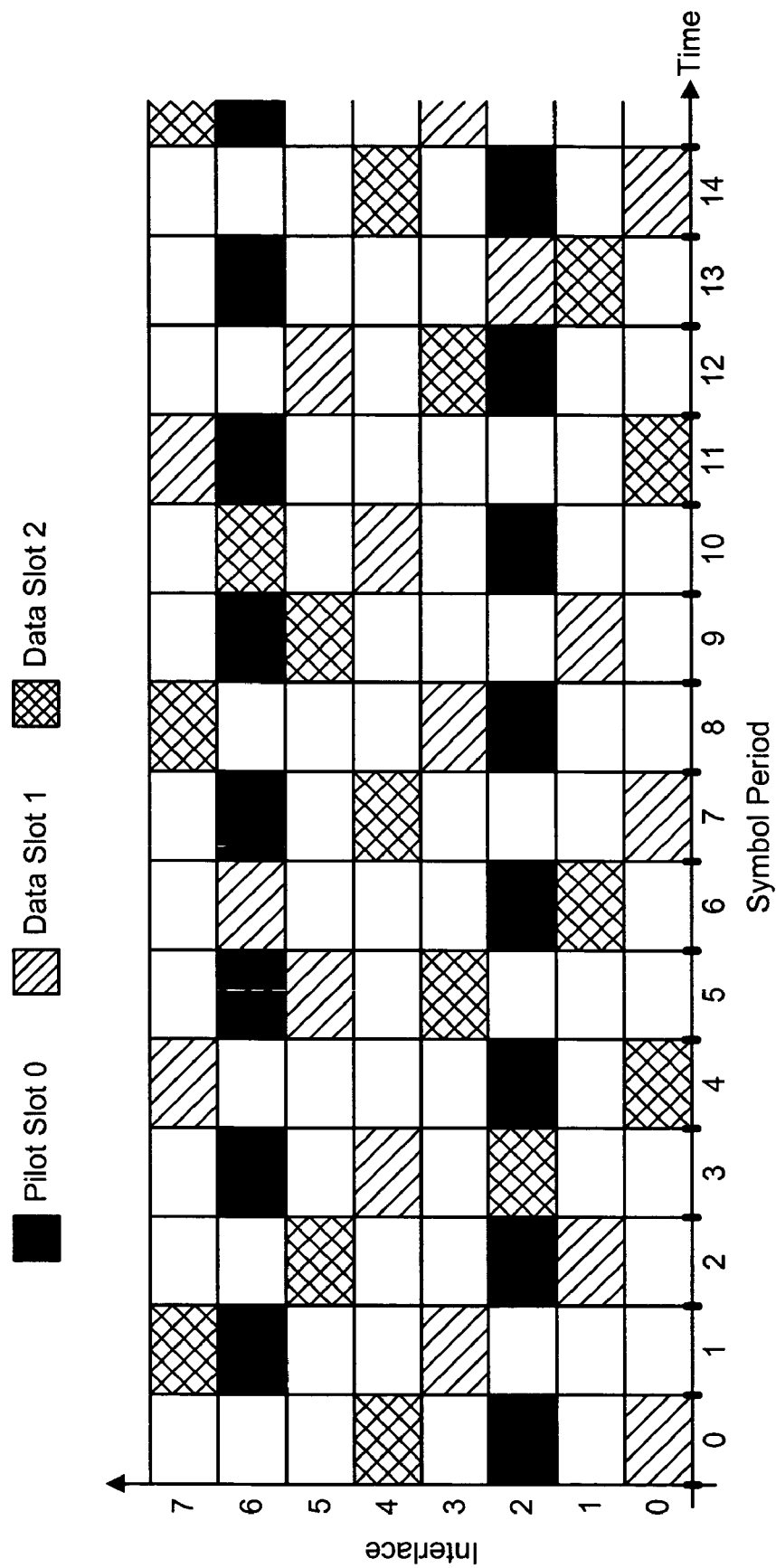
FIG. 4 shows the mapping of a pilot slot and two data slots to interlaces for the first slot-to-interlace mapping scheme.

FIG. 4 shows the mapping of pilot slot 0 and data slots 1 and 2 to interlaces for the first slot-to-interlace mapping scheme. As shown in FIG. 4, each data slot is mapped to seven different interlaces in each 7-symbol period interval and achieves frequency diversity, where one of the seven interlaces is either interlace 2 or 6. The interlaces for each data slot are also at varying distances to the pilot interlaces. Thus, all seven data slots should achieve similar channel estimation and detection performance.

A second slot-to-interlace mapping scheme suitable for transmission scheme 210 in FIG. 2B may be implemented as follows. An interlace sequence is defined as $I_{seq}=\{7, 2, 5, 0, 3, 6, 1, 4\}$ and has indices 0 through 7. A distance sequence is defined as $D=\{7, 2, 4, 6, 1, 5, 3\}$ and has indices 1 through 7. The distance sequence indicates the distances between the interlaces for the seven data slots to the interlace for the pilot. These distances are also called interlace offsets.

The pilot interlace for each symbol period t may be given as:

$$I_{pilot}(t)=I_{seq}\{t \bmod 8\}. \qquad \text{Eq (2)}$$

Equation (2) indicates that the pilot interlace for symbol period t is the k-th interlace in the $I_{seq}$ sequence, where k=t mod 8. The eight interlaces in the $I_{seq}$ sequence are thus selected in sequential order in each 8-symbol period interval.

For the data slots, a rotation factor may be computed for each symbol period t as R(t)=2t mod 7. The distance sequence D is circularly shifted to the right by R(t) to obtain a shifted sequence $D_{R(t)}$. The interlace for each data slot s in symbol period t may then be given as:

$$I_S(t)=[I_{pilot}(t)+D_{R(t)}\{s\}] \bmod 8, \text{ for } s=1, \ldots, 7. \qquad \text{Eq (3)}$$

The slot-to-interlace mapping in equations (2) and (3) ensures that (a) the pilot is sent in all eight interlaces in each 8-symbol period interval, (b) each data slot occupies all of the possible distances from the pilot interlaces in each 7-symbol period interval, and (c) each slot occupies all eight interlaces exactly seven times in each 56-symbol period interval.

Two exemplary slot-to-interlace mapping schemes have been described above. Other slot-to-interlace mapping schemes may also be used, and this is within the scope of the invention.

The data streams may be mapped to the M slots in various manners. In general, each data stream may be sent using one or multiple slots. Multiple data streams may also share the same slot in a time division multiplexed (TDM) manner. Slots may be more easily allocated to the data streams, without having to worry about achieving frequency diversity and similar performance for the data streams. For clarity, much of the description below is for the first and second slot-to-interlace mapping schemes described above.

Figure 5:
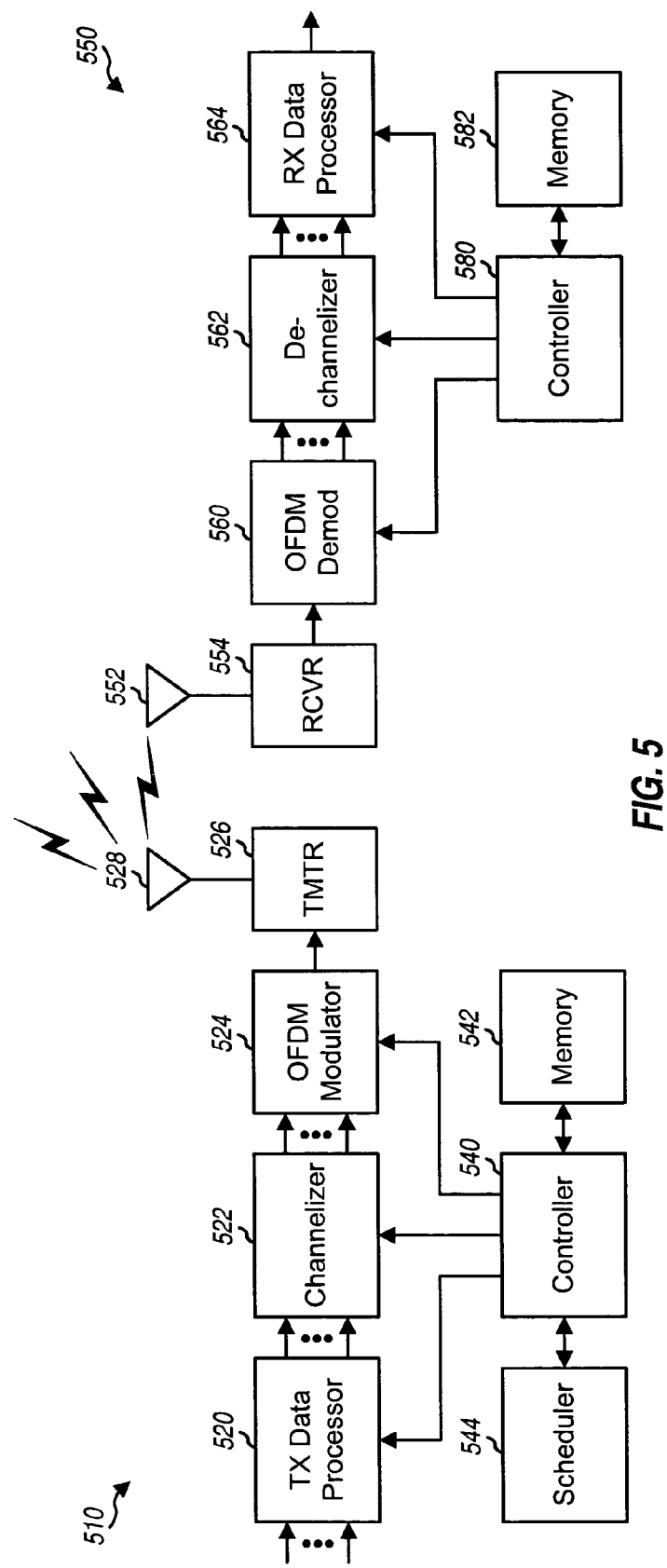
FIG. 5 shows a block diagram of a base station and a wireless device.

FIG. 5 shows a block diagram of a base station 510 and a wireless device 550 in an OFDM system. Base station 510 is generally a fixed station and may also be called a base transceiver system (BTS), an access point, a transmitter, or some other terminology. Wireless device 550 may be fixed or mobile and may also be called a user terminal, a mobile station, a receiver, or some other terminology. Wireless device 550 may also be a portable unit such as a cellular phone, a handheld device, a wireless module, a personal digital assistant (PDA), and so on.

At base station 510, a TX data processor 520 receives multiple (T) streams of data, multiplexes the data and pilot onto the proper slots, and processes (e.g., encodes and interleaves) the data and pilot. A channelizer 522 processes (e.g., scrambles and symbol maps) the data or pilot for each slot and maps each slot to an interlace in each symbol period. An OFDM modulator 524 performs OFDM modulation for the M interlaces and generates a stream of OFDM symbols. A transmitter unit (TMTR) 526 processes (e.g., converts to analog, amplifies, filters, and frequency upconverts) the OFDM symbol stream and generates a modulated signal. Base station 510 transmits the modulated signal from an antenna 528 to the wireless devices.

At wireless device 550, the transmitted signal from base station 510 is received by an antenna 552 and provided to a receiver unit (RCVR) 554. Receiver unit 554 conditions (e.g., filters, amplifies, frequency downconverts, and digitizes) the received signal and generates a stream of input samples. An OFDM demodulator (Demod) 560 performs OFDM demodulation on the input samples to generate received data and pilot symbols, performs detection on the received data symbols, and provides detected data symbols, which are estimates of the data symbols sent by base station 510. A de-channelizer 562 maps the interlaces to slots and further processes (e.g., symbol demaps and descrambles) each slot of interest. An RX data processor 564 then processes (e.g., deinterleaves and decodes) the detected data symbols for each data stream of interest and provides decoded data for that stream. In general, the processing by OFDM demodulator 560, de-channelizer 562 and RX data processor 564 is complementary to the processing by OFDM modulator 524, channelizer 522, and TX data processor 520, respectively, at base station 510.

Controllers 540 and 580 direct operation at base station 510 and wireless device 550, respectively. Memory units 542 and 582 store program codes and data used by controllers 540 and 580, respectively. Controller 540 or a scheduler 544 may allocate slots to the data streams.

Figure 6:
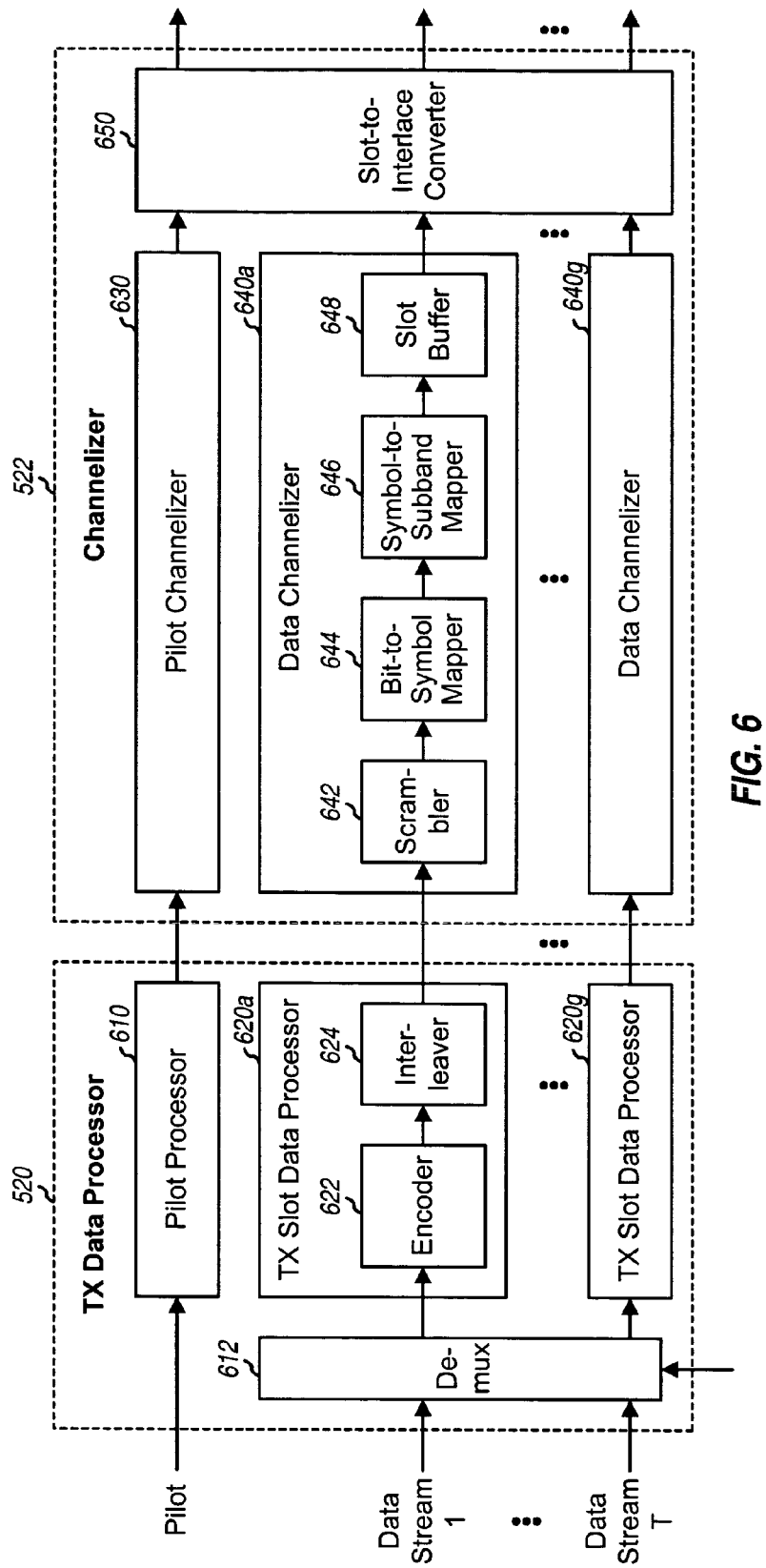
FIG. 6 shows a transmit (TX) data processor and a channelizer.

FIG. 6 shows an embodiment of TX data processor 520 and channelizer 522 at base station 510. TX data processor 520 includes a pilot processor 610, a demultiplexer (Demux) 612, and M−1 TX slot data processors 620a through 620g for the M−1 data slots. Pilot processor 610 generates an FDM pilot for the pilot slot.

Demultiplexer 612 receives the data streams to be transmitted, receives a control indicating the slots assigned to these streams, and passes data packets for these streams to TX slot data processors 620 for the assigned slots. Within each TX slot data processor 620, an encoder 622 encodes the data packets in accordance with a coding scheme and provides coded packets. The coding scheme may include, for example, a Turbo code, a convolutional code, a block code such as a Reed-Solomon code, a cyclic redundancy check (CRC), and so on. An interleaver 624 interleaves (or reorders) the bits in the coded packets in accordance with an interleaving scheme. M−1 TX slot data processors 620a through 620g provide interleaved packets for data slots 1 through M−1, respectively.

Channelizer 522 includes a pilot channelizer 630, M−1 data channelizers 640a through 640g for the M−1 data slots, and a slot-to-interlace converter 650. Pilot channelizer 630 performs channelization for the pilot and provides pilot symbols for the pilot slot. Data channelizers 640a through 640g receive the outputs from TX slot data processors 620a through 620g, respectively. Within each data channelizer 640, a scrambler 642 scrambles the interleaved bits with a pseudo-random number (PN) sequence to randomize the bits. M different PN sequences may be used for the M slots. A bit-to-symbol mapper 644 maps the scrambled bits to modulation symbols in accordance with a modulation scheme (e.g., PSK or QAM) selected for the slot and provides data symbols for the slot. A symbol-to-subband mapper 646 maps the data symbols for each slot onto the proper subbands in the interlace to which the slot is mapped. A slot buffer 648 stores the data symbols for subsequent processing. Slot buffer 648 may also be located at other points in the processing path for the slot.

Slot-to-interlace converter 650 maps each slot to the proper interlace in each symbol period based on the slot-to-interlace mapping scheme used by the system. Converter 650 provides pilot and data symbols for the M interlaces in each symbol period.

Figure 7A:
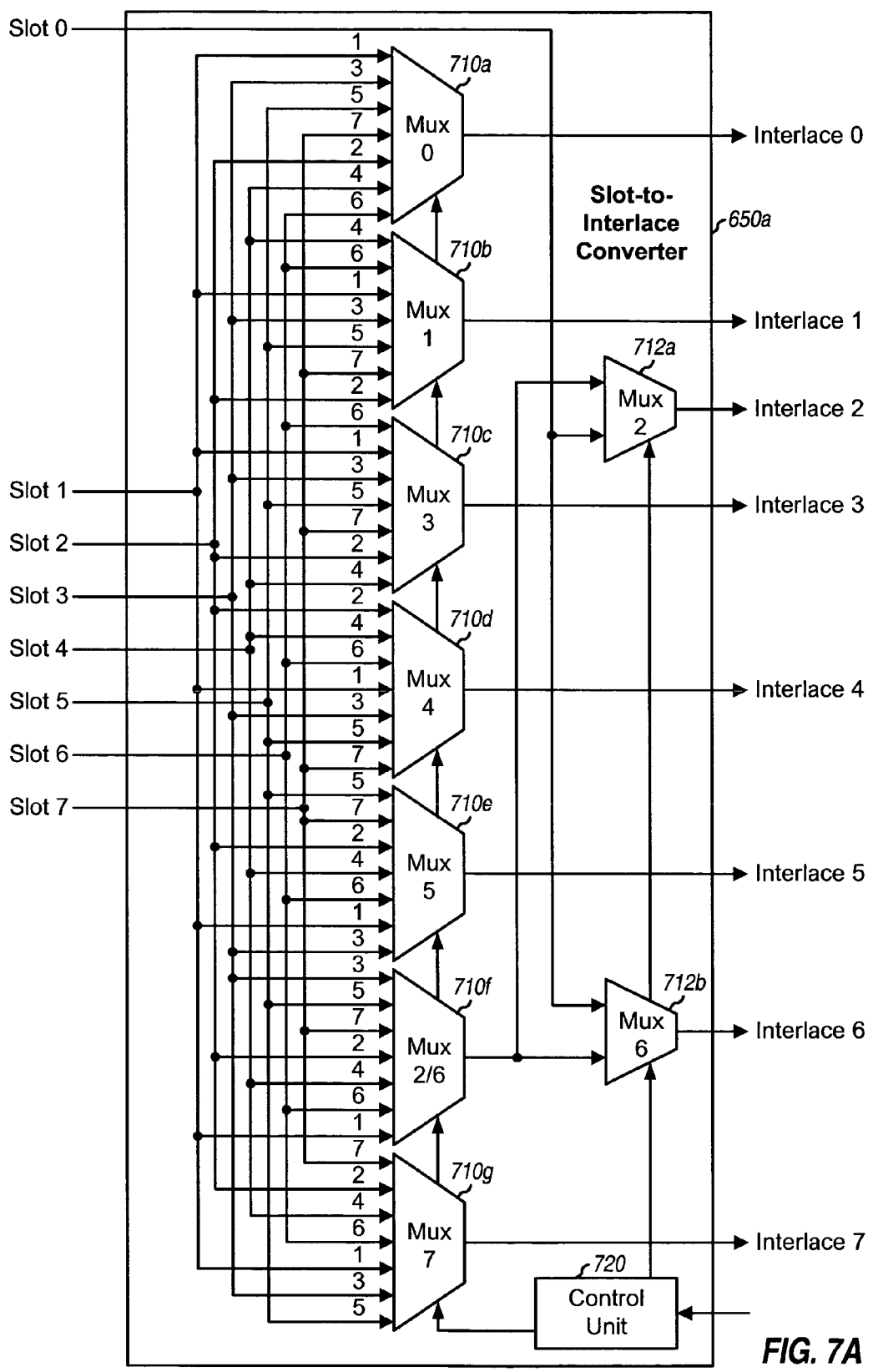
FIGS. 7A, 7B and 7C show three embodiments of a slot-to-interlace converter.

FIG. 7A shows a slot-to-interlace converter 650a, which is an embodiment of slot-to-interlace converter 650 in FIG. 6 for the first slot-to-interlace mapping scheme shown in FIG. 3. For this embodiment, converter 650a includes a first stage of seven multiplexers (Mux) 710a through 710g and a second stage of two multiplexers 712a and 712b. Each multiplexer 710 receives the seven data slots at seven inputs and provides one data slot at its output. For each multiplexer 710, the seven inputs are selected in sequential order and provided to the output in seven symbol periods. Thus, the first input is provided to the output in the first symbol period, the second input is provided to the output in the second symbol period, and so on. For each multiplexer 710, the data slots for the seven inputs are determined by the first slot-to-interlace mapping scheme. As an example, multiplexer 710a provides data slots 1, 3, 5, 7, 2, 4 and 6 for interlace 0 in symbol periods 0, 1, 2, 3, 4, 5 and 6, respectively. Hence, data slots 1, 3, 5, 7, 2, 4 and 6 are provided to the seven inputs of multiplexer 710a. As another example, multiplexer 710b provides data slots 4, 6, 1, 3, 5, 7 and 2 for interlace 1 in symbol periods 0, 1, 2, 3, 4, 5 and 6, respectively, and hence receives these seven data slots at its seven inputs. The inputs for the remaining multiplexers 710 are determined in similar manner.

Multiplexer 710f receives the data slots for interlaces 2 and 6 and provides its output to both multiplexers 712a and 712b, which also receive pilot slot 0. Multiplexer 712a provides the pilot slot to interlace 2 in even-numbered symbol periods and the data slots to interlace 2 in odd-numbered symbol periods. Multiplexer 712b provides the pilot slot to interlace 6 in odd-numbered symbol periods and the data slots to interlace 6 in even-numbered symbol periods.

A control unit 720 generates the controls for multiplexers 710 and 712. For the first slot-to-interlace mapping scheme, control unit 720 may include a modulo-7 counter for the first stage of multiplexers 710 and a modulo-2 counter for the second stage of multiplexers 712. The modulo-7 counter counts from zero through six, then back to zero, and so on, and provides a 3-bit control signal to all multiplexers 710. Each multiplexer 710 cycles through the seven inputs in seven symbol periods based on the 3-bit control signal. The modulo-2 counter counts from zero to one, then back to zero, and so on, and provides a 1-bit control signal to both multiplexers 712. The 1-bit control signal alternately selects the two inputs of each multiplexer 712. The two counters may be reset at appropriate time instants, e.g., at the start of each super-frame.

Figure 7B:
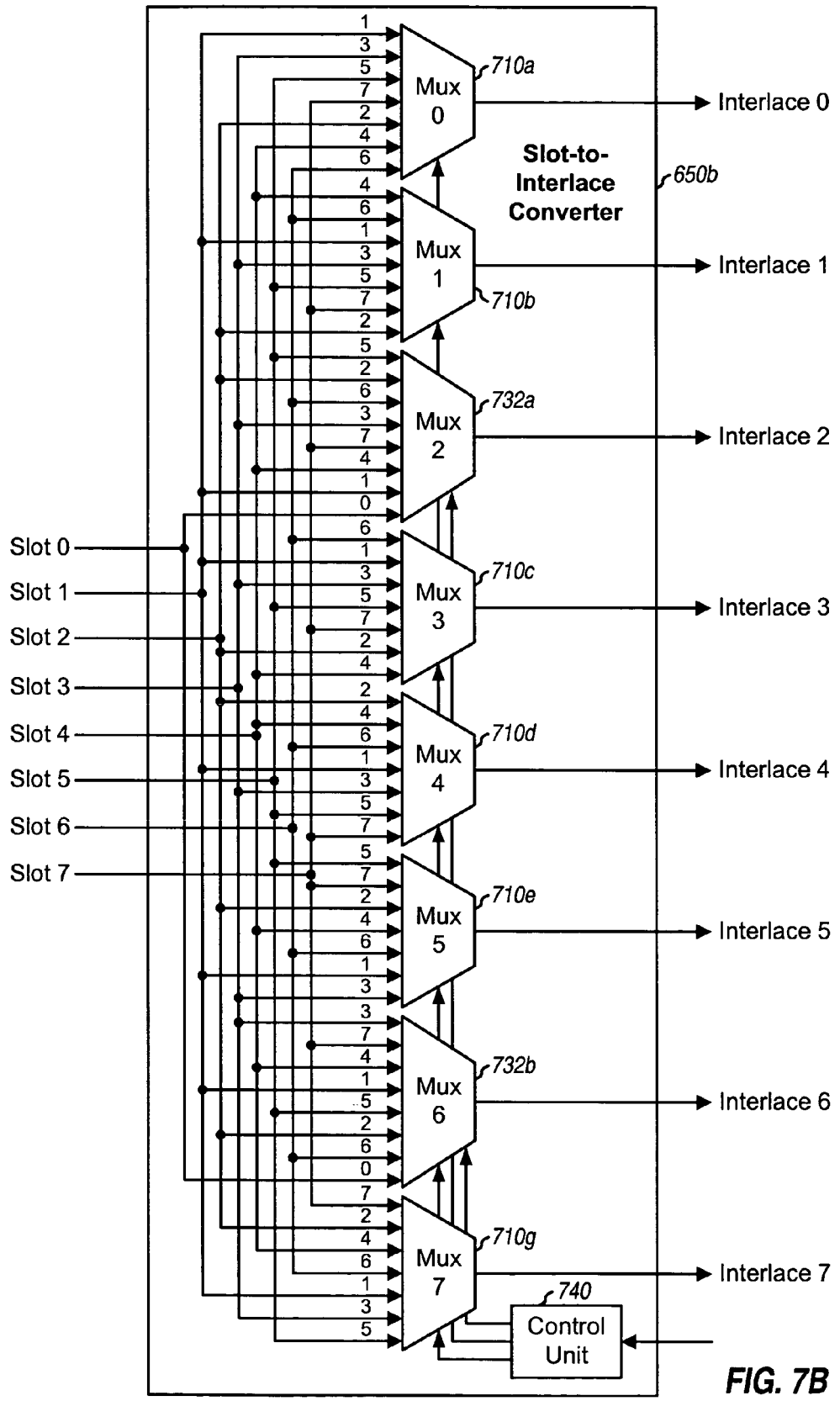

FIG. 7B shows a slot-to-interlace converter 650b, which is another embodiment of slot-to-interlace converter 650 in FIG. 6 for the first slot-to-interlace mapping scheme. For this embodiment, converter 650b includes a single stage of eight total multiplexers, six multiplexers 710a through 710g and two multiplexers 732a and 732b, for the eight interlaces. Multiplexers 710a through 710g receive the seven data slots at seven inputs and provide outputs for interlaces 0, 1, 3, 4, 5 and 7, respectively, as described above in FIG. 7A. Multiplexer 732a receives seven data slots 5, 2, 6, 3, 7, 4 and 1 and pilot slot 0 at eight inputs and provides an output for interlace 2. Multiplexer 732b receives seven data slots 3, 7, 4, 1, 5, 2 and 6 and pilot slot 0 at eight inputs and provides an output for interlace 6.

A control unit 740 provides to multiplexers 710a through 710g a first control signal that sequentially selects the seven data slots at the seven inputs in seven symbol periods. Control unit 740 provides to multiplexer 732a a second control signal that sequentially selects the seven data slots in seven odd-numbered symbol periods and selects pilot slot 0 in even-numbered symbol periods. Control unit 740 provides to multiplexer 732b a third control signal that sequentially selects the seven data slots in seven even-numbered symbol periods and selects pilot slot 0 in odd-numbered symbol periods.

Figure 7C:
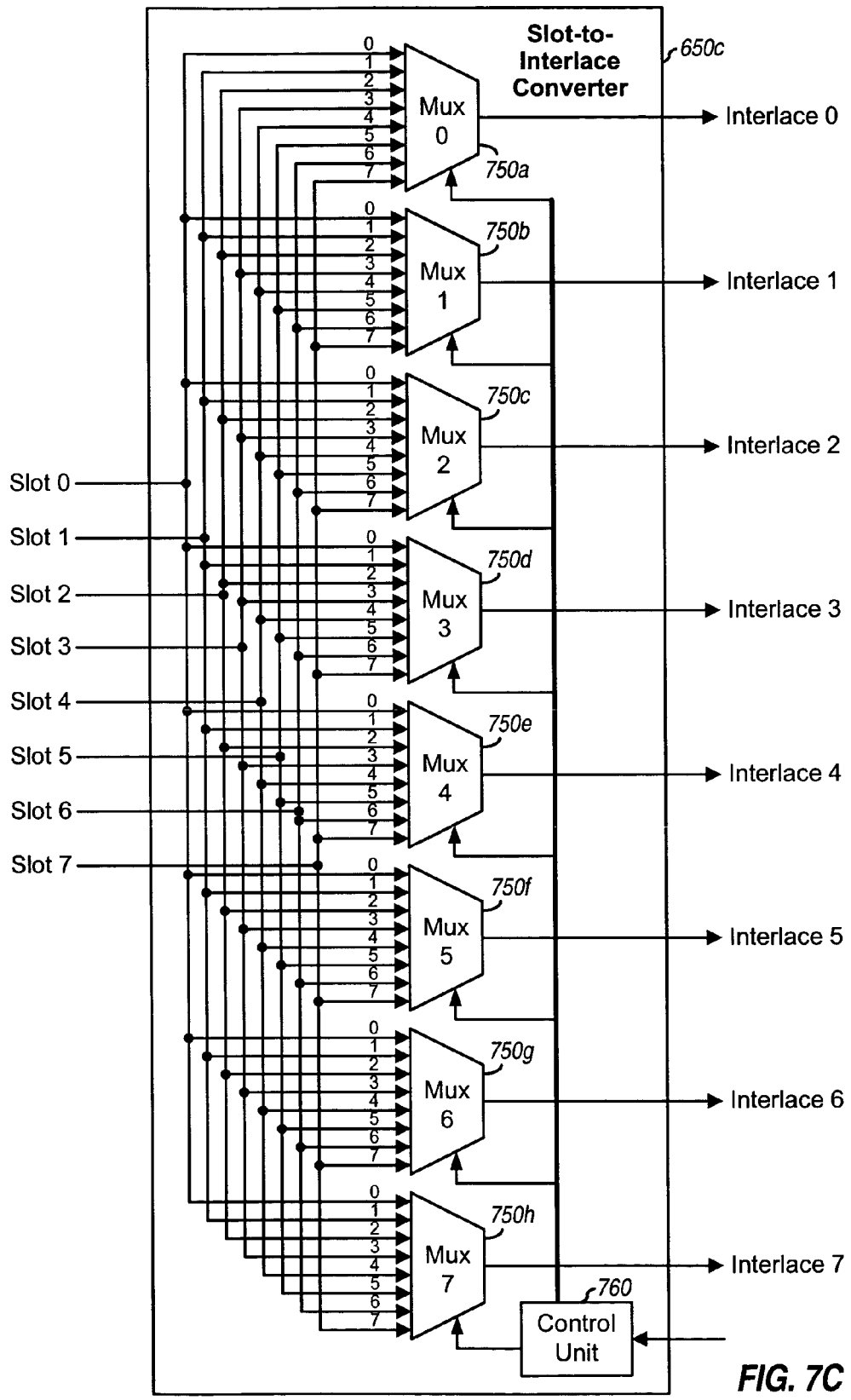

FIG. 7C shows a slot-to-interlace converter 650c, which is yet another embodiment of slot-to-interlace converter 650 in FIG. 6. For this embodiment, converter 650c includes a single stage of eight multiplexers 750a through 750h for eight interlaces 0 through 7, respectively. Each multiplexer 750 receives slots 0 through 7 at eight inputs and provides one slot to an associated interlace in each symbol period. A control unit 760 provides control signals for multiplexers 750a through 750h. The control signal for each multiplexer 750 selects the proper slot to provide to the associated interlace in each symbol period. Converter 650c can implement any slot-to-interlace mapping scheme by generating appropriate control signals for multiplexers 750.

Figure 8:
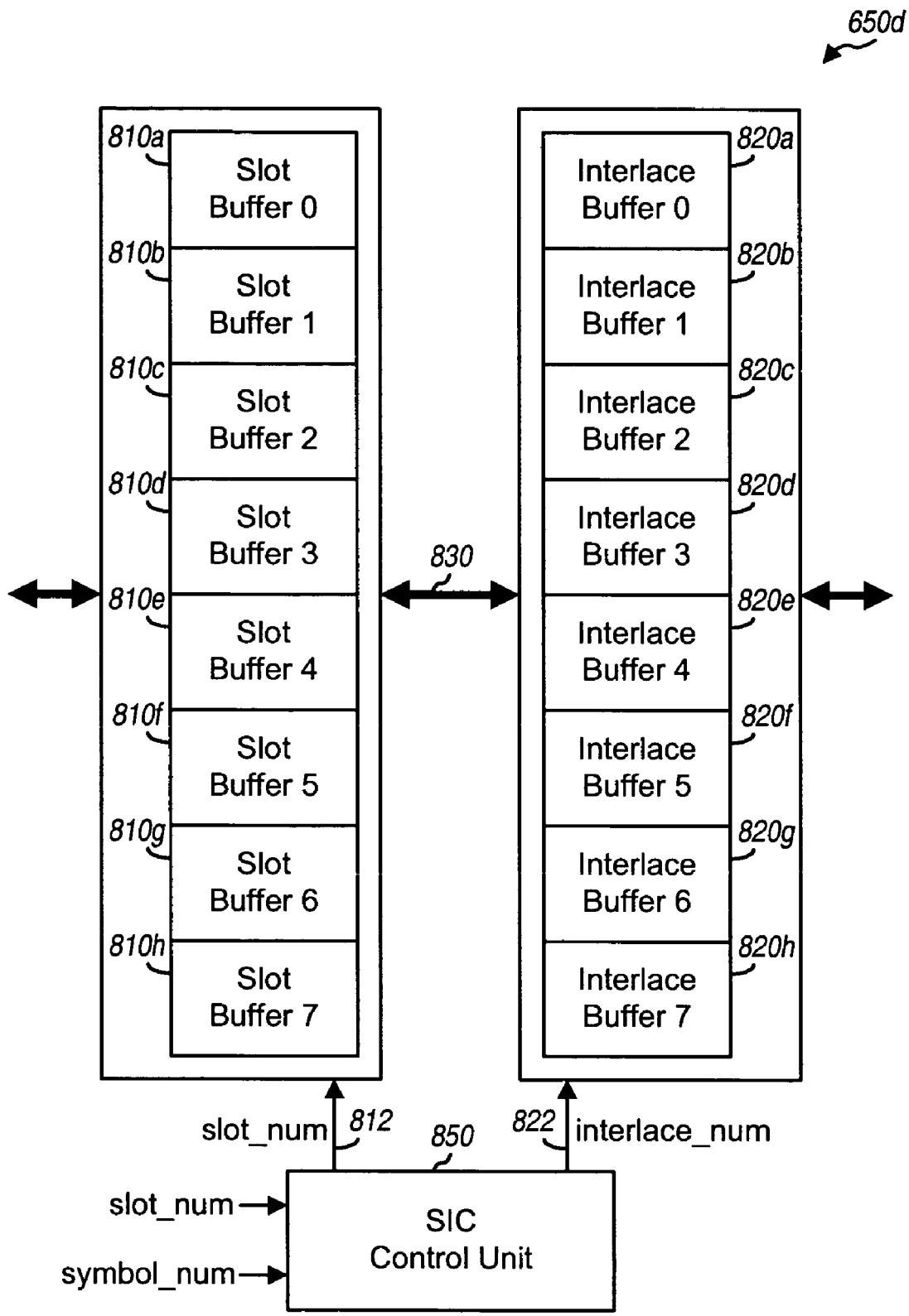
FIG. 8 shows another embodiment of a slot-to-interlace converter.

FIG. 8 shows a slot-to-interlace converter 650d, which is yet another embodiment of slot-to-interlace converter 650 in FIG. 6. The data and pilot symbols for the eight slots are stored in slot buffers 810a through 810h, and the data and pilot symbols for the eight interlaces are stored in interlace buffers 820a through 820h. Each slot buffer 810 may correspond to one slot buffer 648 in FIG. 6. A data bus 830 is used to transfer data/pilot from slot buffers 810 to interlace buffers 820. A select line 812 selects one of the eight slot buffers 810 at any given moment. A select line 822 enables one of the eight interlace buffers 820 at any given moment. A SIC control unit 850 generates select lines 812 and 822 such that symbols from a selected slot buffer 810 are transferred via data bus 830 to a selected interlace buffer 820.

Figure 9A:
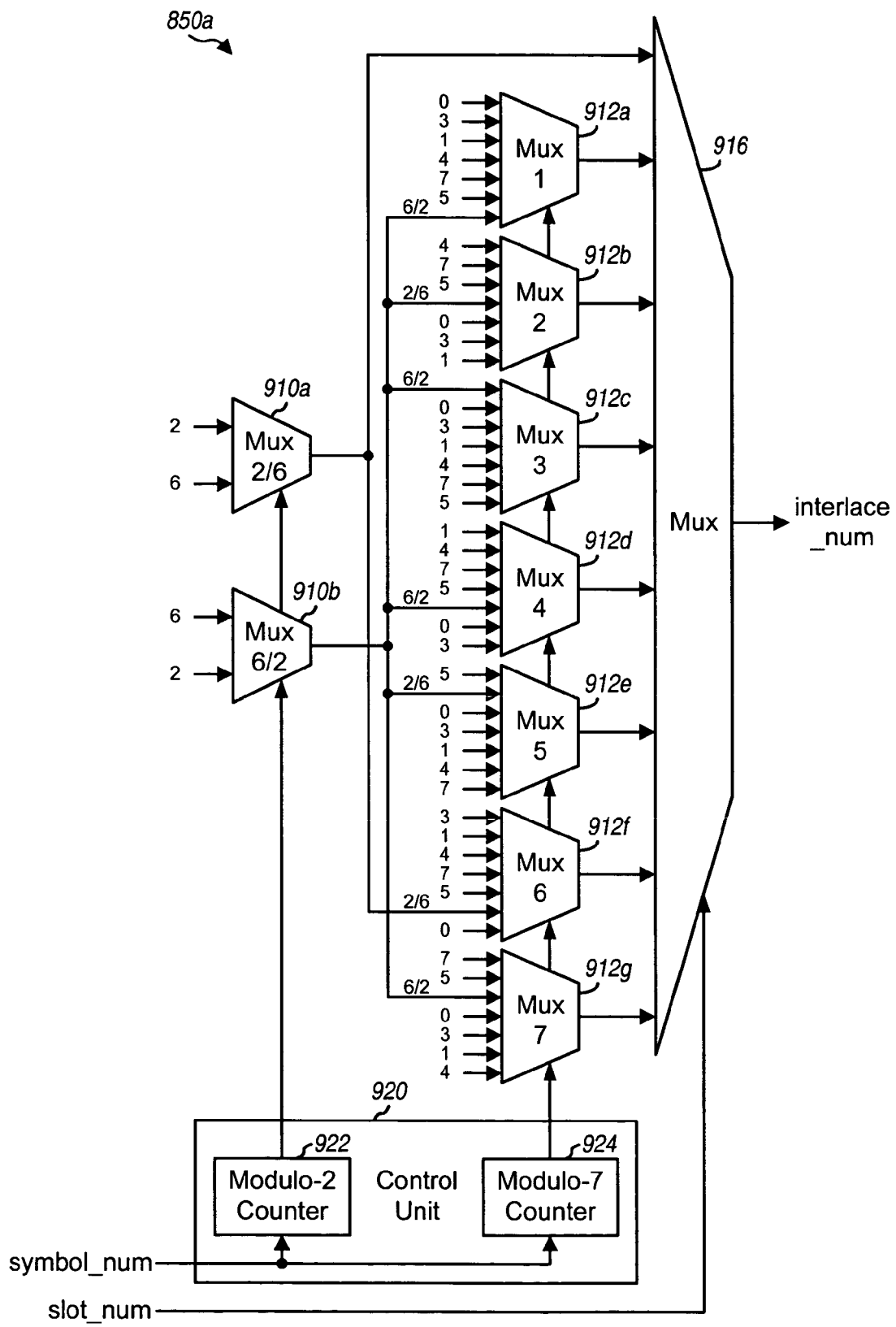
FIGS. 9A and 9B show two embodiments of a SIC control unit.

FIG. 9A shows a SIC control unit 850a, which is an embodiment of SIC control unit 850 for the first slot-to-interlace mapping scheme. For this embodiment, SIC control unit 850a receives slot_num and symbol_num inputs and provides an interlace_num output. Symbol_num indicates the current symbol period t. For a given symbol period, unit 850a provides the interlace (interlace_num) to use for a given slot (slot_num).

For the embodiment shown in FIG. 9A, SIC control unit 850a includes a first stage of two multiplexers 910a and 910b and a second stage of seven multiplexers 912a through 912g for the seven data slots 1 through 7. Multiplexer 910a receives interlaces 2 and 6, provides interlace 2 in even-numbered symbol periods, and provides interlace 6 in odd-numbered symbol periods. Multiplexer 910b also receives interlaces 2 and 6, provides interlace 6 in even-numbered symbol periods, and provides interlace 2 in odd-numbered symbol periods. Each multiplexer 912 receives seven data interlaces at seven inputs and provides one data interlace at its output. For each multiplexer 912, the seven inputs are selected in sequential order in seven symbol periods and provided to the output. Thus, the first input is provided to the output in the first symbol period, the second input is provided to the output in the second symbol period, and so on. For each multiplexer 912, the interlaces for the seven inputs are determined by the first slot-to-interlace mapping scheme. As an example, multiplexer 912a provides interlaces 0, 3, 1, 4, 7, 5 and 6 for data slot 1 in symbol periods 0, 1, 2, 3, 4, 5 and 6, respectively. Hence, interlaces 0, 3, 1, 4, 7, 5 and 6 are provided to the seven inputs of multiplexer 912a. As another example, multiplexer 912b provides interlaces 4, 7, 5, 2, 0, 3 for data slot 2 and 1 in symbol periods 1, 2, 3, 4, 5, 6 and 7, respectively, and hence receives these interlaces at its seven inputs. The inputs for the remaining multiplexers 912 are determined in similar manner. A multiplexer 916 receives the interlaces for the eight slots at eight inputs and provides the interlace for the slot indicated by slot_num.

A control unit 920 generates the controls for multiplexers 910 and 912. Within control unit 920, a modulo-2 counter 922 and a modulo-7 counter 924 are incremented in each symbol period by the symbol_num input. The 1-bit output from counter 922 selects one of the two inputs of each multiplexer 910. The 3-bit output from counter 924 selects one of the seven inputs of each multiplexer 912.

Figure 9B:
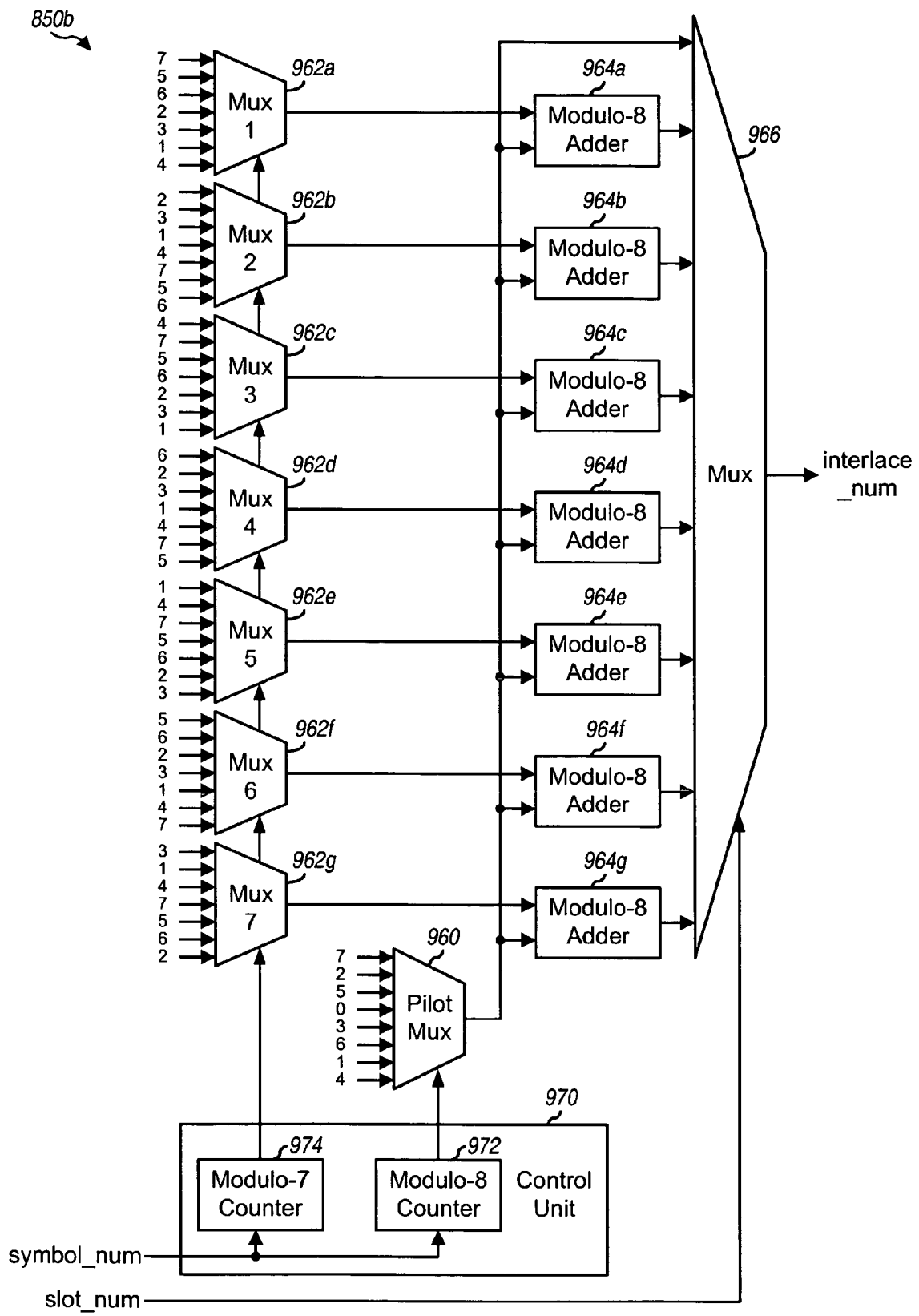

FIG. 9B shows a SIC control unit 850b, which is an embodiment of SIC control unit 850 for the second slot-to-interlace mapping scheme described above. Within unit 850b, a multiplexer 960 receives the eight interlaces for the pilot slot at eight inputs, selects these inputs in sequential order, and provides the selected interlace $I_{pilot}(t)$ as the pilot interlace. Multiplexer 960 implements equation (2). Multiplexers 962a through 962g provide the interlace offsets for data slots 1 through 7, respectively. Each multiplexer 962 receives the interlace offsets for different symbol periods at seven inputs, selects these inputs in sequential order, and provides the selected interlace offset $D_{R(t)}\{s\}$ for the associated data slot. For each multiplexer 962, the interlace offsets for the seven inputs are determined by the second slot-to-interlace mapping scheme. Modulo-8 adders 964a through 964g receive the pilot interlace from multiplexer 960 and the interlace offsets from multiplexers 962a through 962g, respectively. Each adder 964 performs modulo-8 addition on the two inputs $I_{pilot}(t)$ and $D_{R(t)}\{s\}$, as shown in equation (3), and provides the interlace $I_s(t)$ for the associated data slot. A multiplexer 966 receives the interlaces for the eight slots at eight inputs and provides the interlace for the slot indicated by slot_num.

A control unit 970 generates the controls for multiplexers 960 and 962. Within control unit 970, a modulo-8 counter 972 and a modulo-7 counter 974 are incremented in each symbol period by the symbol_num input. The 3-bit output from counter 972 selects one of the eight inputs of multiplexer 960. The 3-bit output from counter 974 selects one of the seven inputs of each multiplexer 962.

FIGS. 7A through 9B show various embodiments of slot-to-interlace converter 650. Converter 650 may also be implemented with other designs, and this is within the scope of the invention. Slot-to-interlace converter 650 may pass data and pilot from slots to interlaces using various means, e.g., via multiplexers as shown in FIGS. 7A through 7C, via selectable memory banks as shown in FIG. 8, or via some other mechanism. The slot-to-interlace conversion may be performed in the data path or in the SIC control unit.

Multiple stages of multiplexers may be used for certain slot-to-interlace mapping schemes to reduce the amount of hardware and to simplify the generation of the control signals for the multiplexers, e.g., as shown in FIGS. 7A, 9A and 9B. A single stage of M multiplexers may also be used for M interlaces or slots. For example, each multiplexer may receive the M slots and provide one slot to an associated interlace in each symbol period, e.g., as shown in FIGS. 7B and 7C. The slots may be provided to the multiplexer inputs in a permutated order determined by the slot-to-interlace mapping scheme, e.g., as shown in FIGS. 7A and 7B. This permutated order may allow the multiplexers to share common control signals, which may also be generated more easily with modulo counters. The slots may also be provided to the multiplexer inputs in linear order, as shown in FIG. 7C, and an appropriate control signal may be provided to each multiplexer to select the proper input for each symbol period.

Figure 10:
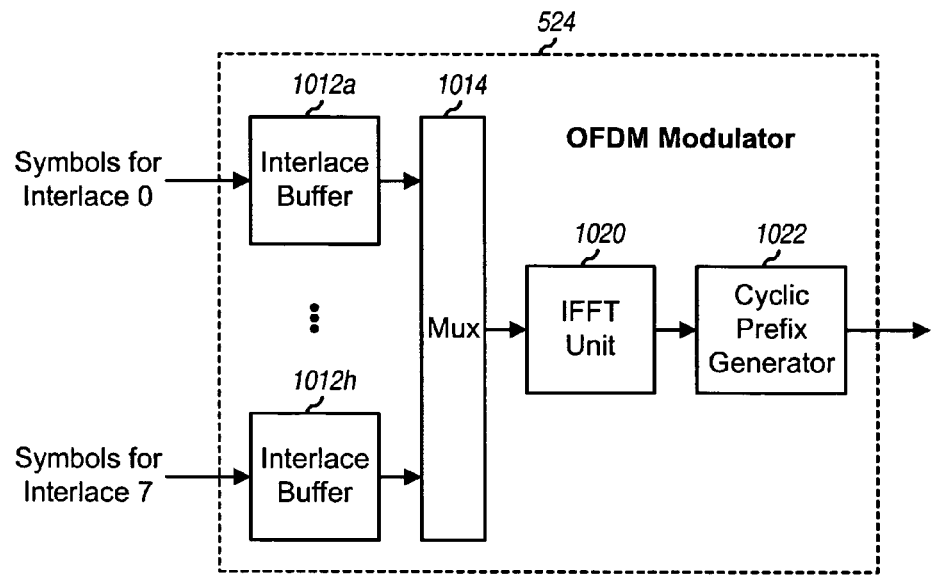
FIG. 10 shows an OFDM modulator.

FIG. 10 shows a block diagram of an embodiment of OFDM modulator 524 at base station 510. Within OFDM modulator 524, the pilot and data symbols for interlaces 0 through 7 are provided to eight buffers 1012a through 1012h, respectively, which may correspond to interlace buffers 820a through 820h, respectively, in FIG. 8. For each symbol period, a multiplexer 1014 provides P data or pilot symbols from each buffer 1012 to an IFFT unit 1020. For each symbol period, IFFT unit 1020 transforms K symbols for the K total subbands to the time domain with a K-point IFFT and provides a transformed symbol that contains K time-domain samples. To combat intersymbol interference (ISI), which is caused by frequency selective fading, a cyclic prefix generator 1022 repeats C samples of each transformed symbol to form an OFDM symbol that contains K+C samples. The repeated portion is often called a cyclic prefix or guard interval. For example, the cyclic prefix length may be C=P. Each OFDM symbol is transmitted in one symbol period, which is K+C sample periods. Cyclic prefix generator 1022 provides a stream of OFDM symbols.

Figure 11:
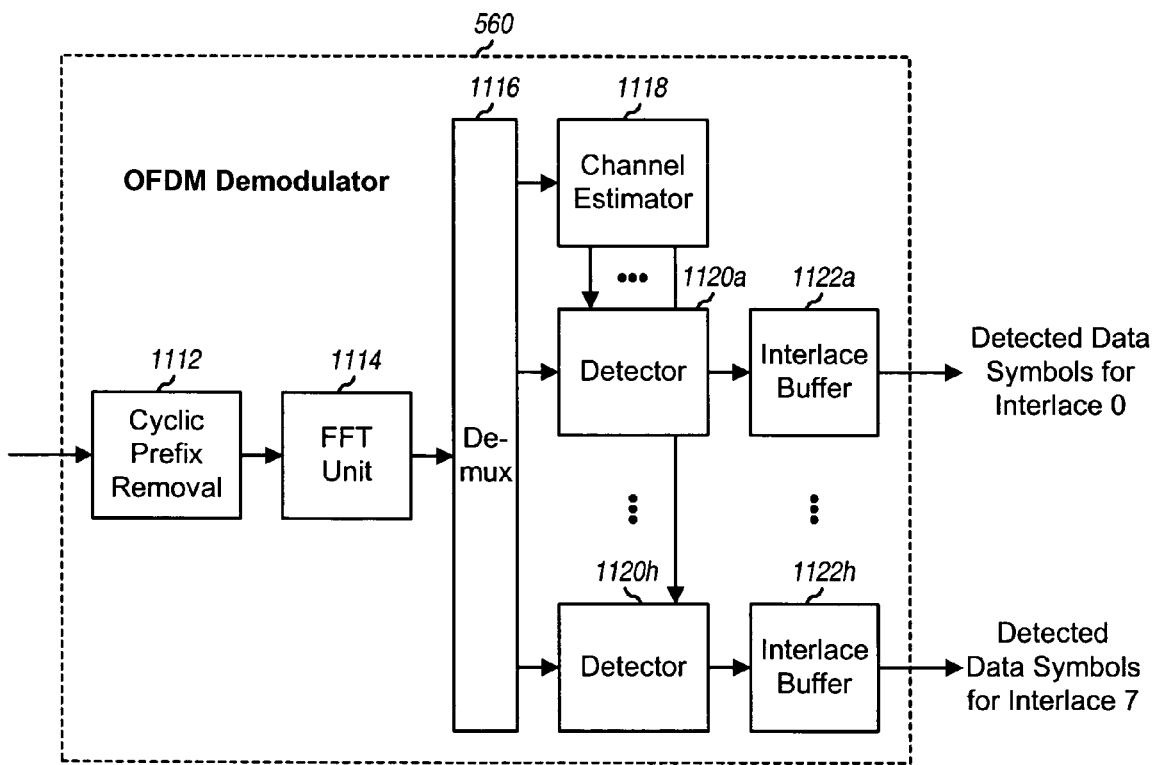
FIG. 11 shows an OFDM demodulator.

FIG. 11 shows a block diagram of an embodiment of OFDM demodulator 560 at wireless device 550. Within OFDM demodulator 560, a cyclic prefix removal unit 1112 removes the cyclic prefix in each received OFDM symbol and provides K input samples for the OFDM symbol. An FFT unit 1114 performs a K-point FFT on the K input samples for each OFDM symbol and provides K received symbols for the K total subbands. In each symbol period, a demultiplexer 1116 provides received pilot symbols from the pilot interlace to a channel estimator 1118 and provides received data symbols for the M−1 data interlaces to M−1 of M detectors 1120a through 1120h. Channel estimator 1118 derives channel gain estimates for each data interlace based on the received pilot symbols. Each detector 1120 performs detection (e.g., equalization or matched filtering) on the received data symbols for its data interlace with the channel gain estimates for this interlace and provides P detected data symbols for the interlace to an associated buffer 1122. Although not shown in FIG. 11, FFT unit 1114 may perform a partial P-point FFT on the K input samples for each interlace of interest and provide P received symbols for the P subbands in that interlace. The channel estimation and detection may thus be performed for each interlace of interest instead of all interlaces.

Figure 12:
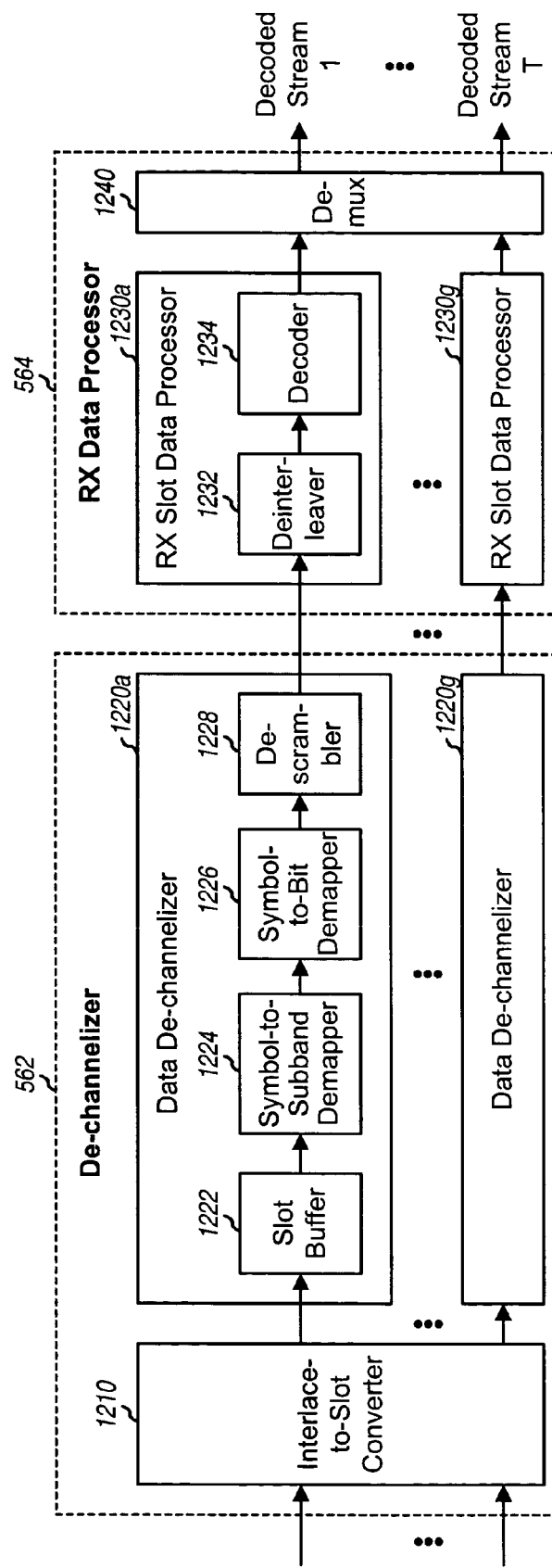
FIG. 12 shows a de-channelizer and a receive (RX) data processor.

FIG. 12 shows an embodiment of de-channelizer 562 and RX data processor 564 at wireless device 550. Within de-channelizer 562, an interlace-to-slot converter 1210 maps each data interlace to the proper slot in each symbol period based on the slot-to-interlace mapping scheme used by the system. In each symbol period, converter 1210 provides detected data symbols for the M−1 data slots to M−1 data de-channelizers 1220a through 1220g. Each data de-channelizer 1220 includes a slot buffer 1222, a symbol-to-subband demapper 1224, a symbol-to-bit demapper 1226, and a descrambler 1228 that perform processing complementary to the processing performed by data channelizer 640 at base station 510.

RX data processor 564 includes M−1 RX slot data processors 1230a through 1230g for the M−1 data slots. Each RX slot data processor 1230 includes a deinterleaver 1232 and a decoder 1234 that receive the output from one data de-channelizer 1220 and perform processing complementary to the processing performed by TX slot data processor 620 at base station 510. A demultiplexer 1240 demultiplexes decoded data from RX slot data processors 1230 onto the proper data streams.

Figure 13A:
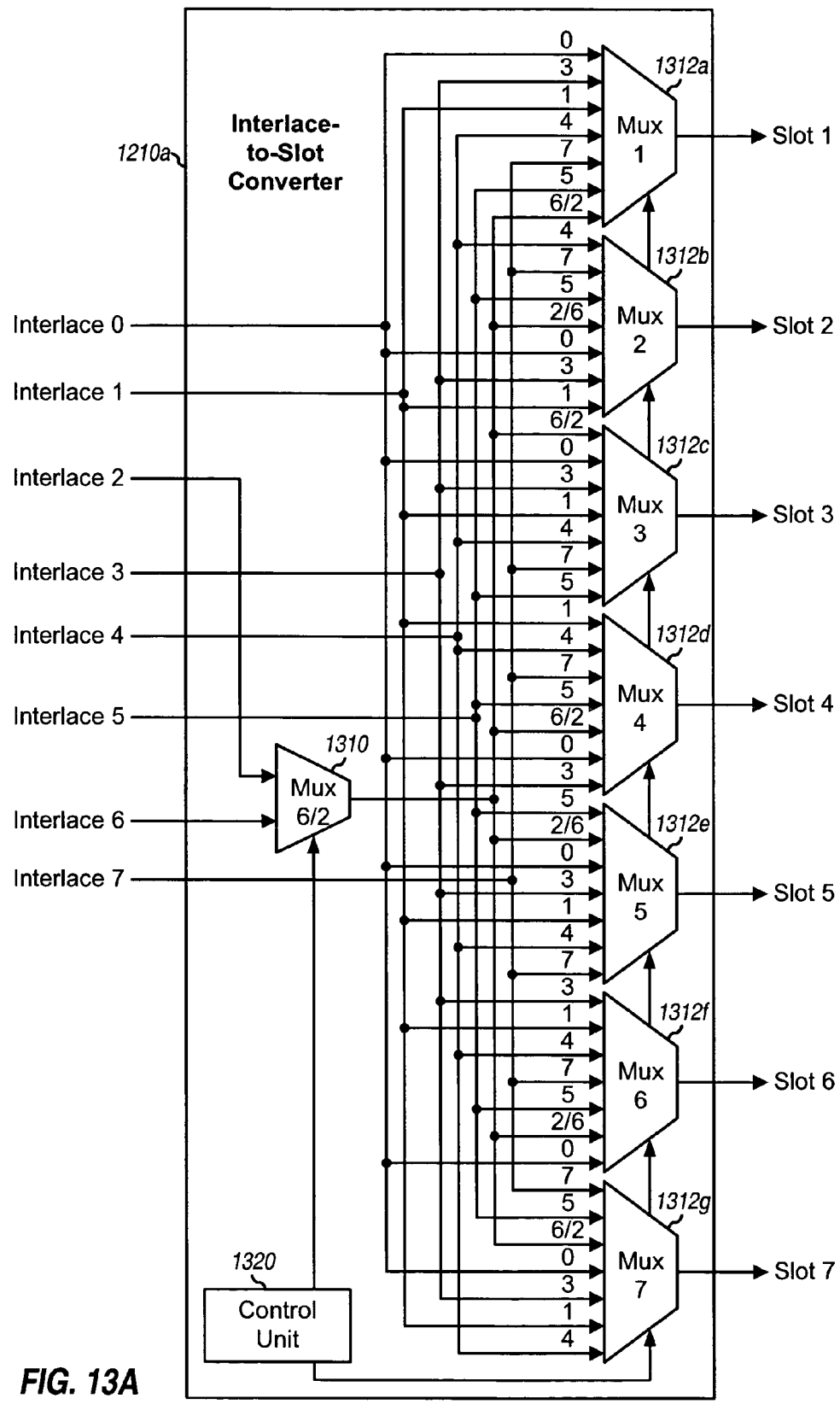
FIGS. 13A and 13B show two embodiments of an interlace-to-slot converter.

FIG. 13A shows an interlace-to-slot converter 1210a, which is an embodiment of interlace-to-slot converter 1210 in FIG. 12 for the first slot-to-interlace mapping scheme shown in FIG. 3. For this embodiment, converter 1210a includes a first stage of one multiplexer 1310 and a second stage of seven multiplexers 1312a through 1312g for the seven data slots 1 through 7, respectively. Multiplexer 1310 receives interlaces 2 and 6, provides interlace 2 in odd-numbered symbol periods, and provides interlace 6 in even-numbered symbol periods. Each multiplexer 1312 receives the seven data interlaces for each symbol period at seven inputs and provides one data interlace for the associated data slot. For each multiplexer 1312, the seven inputs are selected in sequential order in seven symbol periods and provided to the output. For each multiplexer 1312, the seven interlaces for the seven inputs are determined by the first slot-to-interlace mapping scheme. As an example, multiplexer 1312a provides interlaces 0, 3, 1, 4, 7, 5 and 6 for data slot 1 in symbol periods 0, 1, 2, 3, 4, 5 and 6, respectively. Hence, interlaces 0, 3, 1, 4, 7, 5 and 6 are provided to the seven inputs of multiplexer 1312a. The inputs for the remaining multiplexers 1312 are determined in similar manner. A control unit 1320 provides a first control signal for multiplexer 1310 and a second control signal for multiplexers 1312a through 1312g.

Figure 13B:
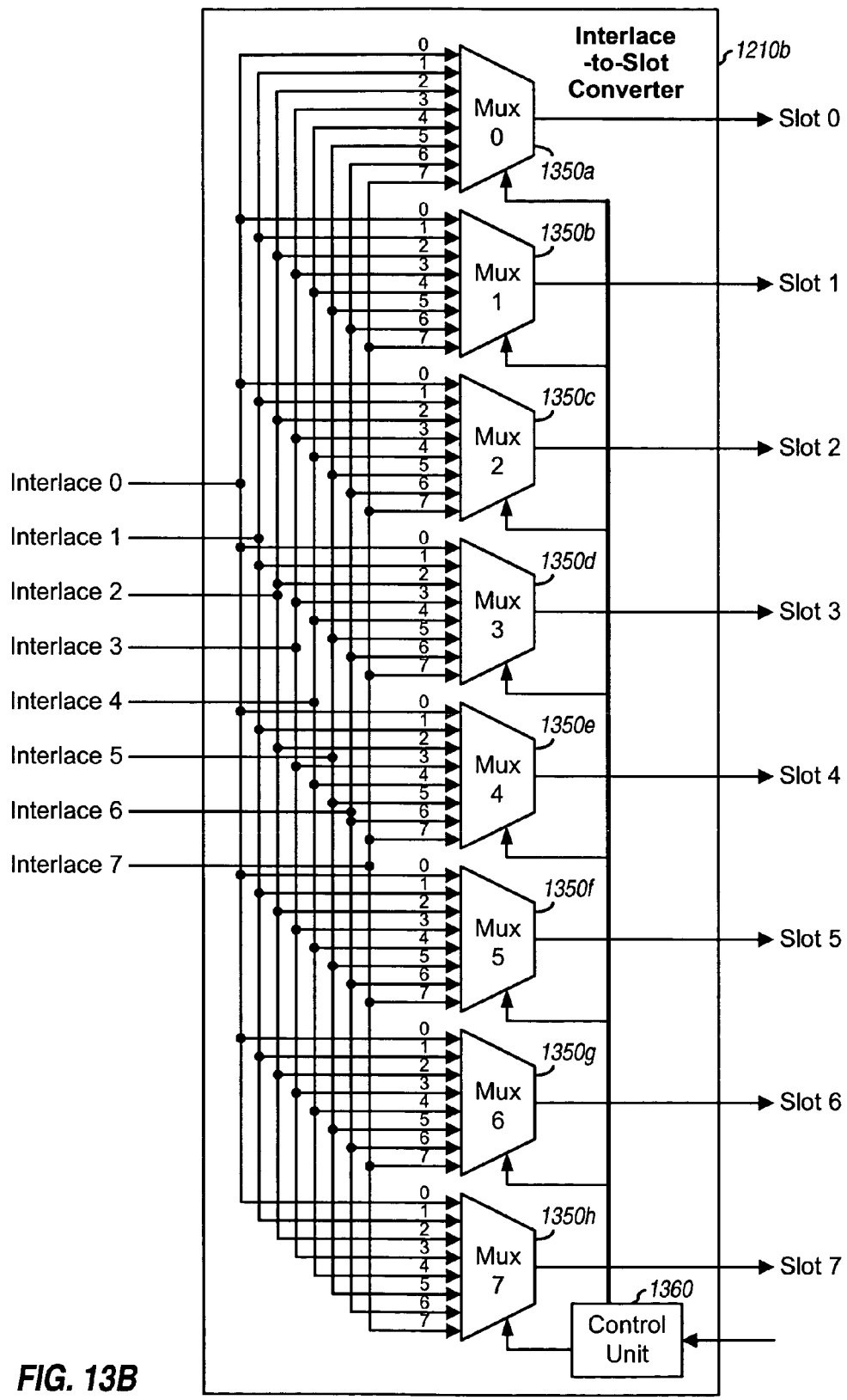

FIG. 13B shows an interlace-to-slot converter 1210b, which is another embodiment of interlace-to-slot converter 1210 in FIG. 12. For this embodiment, converter 1210b includes a single stage of eight multiplexers 1350a through 1350h for eight slots 0 through 7, respectively. Each multiplexer 1350 receives interlaces 0 through 7 at eight inputs and provides one interlace for the associated slot. A control unit 1360 generates control signals for multiplexers 1350a through 1350h. The control signal for each multiplexer 1350 selects the proper interlace to provide to the associated slot in each symbol period. Converter 1350b can implement any slot-to-interlace mapping scheme by generating appropriate control signals for multiplexers 1350.

Interlace-to-slot converter 1210 may also be implemented with the structure shown in FIG. 8 with two banks of buffers for the interlaces and slots.

The multiplexing techniques described herein may be used for data and pilot transmission on the forward link (or downlink) from a base station to the wireless device, as described above. These techniques may also be used for data and pilot transmission on the reverse link (or uplink) from a wireless device to a base station.

The multiplexing techniques described herein may be implemented in hardware, software, or a combination thereof. The units used for multiplexing data and pilot (e.g., slot-to-interlace converter 650 in FIG. 6 and interlace-to-slot converter 1210 in FIG. 12) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The control units for the converters may be implemented with hardware and/or software. Software codes may be stored in a memory unit (e.g., memory unit 542 or 582 in FIG. 5) and executed by a processor (e.g., controller 540 or 580).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a plurality of multiplexers configured to map a plurality of slots to a plurality of interlaces with the plurality of slots and the plurality of interlaces being equal in quantity, wherein the plurality of slots correspond to a plurality of transmission units and the plurality of interlaces correspond to a plurality of sets of frequency subbands, and wherein the plurality of multiplexers are arranged in at least two stages; and
    a control unit configured to generate at least one control signal for the plurality of multiplexers.

2. The apparatus of claim 1, wherein the plurality of multiplexers are configured to map the plurality of slots to different ones of the plurality of interlaces in different time intervals.

3. The apparatus of claim 1, wherein the plurality of slots comprise at least one pilot slot used for pilot and at least two data slots used for data.

4. The apparatus of claim 3, wherein the plurality of multiplexers are configured to map the at least one pilot slot to at least two interlaces among the plurality of interlaces in different time intervals.

5. The apparatus of claim 4, wherein the plurality of multiplexers are configured to map each of the at least two data slots to different interlaces at varying distances to the at least two interlaces for the pilot slot in different time intervals.

6. The apparatus of claim 1, wherein the plurality of multiplexers are configured to map one slot used for pilot to two interlaces in alternating symbol periods.

7. The apparatus of claim 1, wherein the plurality of multiplexers are configured to map one slot used for pilot to the plurality of interlaces in a plurality of symbol periods.

8. The apparatus of claim 1, wherein the plurality of multiplexers are configured to receive symbols for the plurality of slots and to provide the symbols to the plurality of interlaces.

9. The apparatus of claim 1, wherein the plurality of multiplexers are configured to receive interlace indices for the plurality of interlaces and to provide interlace indices for the plurality of slots.

10. The apparatus of claim 1, wherein the plurality of slots comprise a pilot slot used for pilot and at least two data slots used for data, wherein one of the plurality of multiplexers is configured to receive interlace indices for the pilot slot, and wherein remaining ones of the plurality of multiplexers are configured to receive interlace offsets for the at least two data slots.

11. The apparatus of claim 10, further comprising:
    a plurality of adders configured to sum an interlace index for the pilot slot with the interlace offsets and to provide interlace indices for the at least two data slots.

12. The apparatus of claim 1, wherein the plurality of slots comprise at least one pilot slot used for pilot and at least two data slots used for data, wherein one stage of multiplexers is configured to receive the at least one pilot slot, and wherein each remaining stage of multiplexers is configured to receive the at least two data slots.

13. The apparatus of claim 1, wherein the control unit is configured to generate a single control signal for each stage of multiplexers among the at least two stages of multiplexers.

14. The apparatus of claim 1, wherein the control unit comprises at least two counters, one counter for each stage of multiplexers, each counter generating a control signal for an associated stage of multiplexers.

15. The apparatus of claim 1, wherein each of the plurality of multiplexers is for one of the plurality of interlaces, and wherein each multiplexer is configured to receive the plurality of slots and to provide different ones of the plurality of slots for an associated interlace in different time intervals.

16. The apparatus of claim 1, wherein the plurality of multiplexers are configured to receive the plurality of slots in a permutated order determined based on a slot-to-interlace mapping scheme.

17. The apparatus of claim 1, wherein the at least one control signal selects a plurality of inputs of each multiplexer in a sequential order, one input in each time interval.

18. The apparatus of claim 1, wherein the plurality of multiplexers are configured to provide an interlace number for a slot number for a time interval.

19. The apparatus of claim 18, further comprising:
    a first plurality of buffers for the plurality of slots, wherein one of the first plurality of buffers is selected based on the slot number; and
    a second plurality of buffers for the plurality of interlaces, wherein one of the second plurality of buffers is selected based on the interlace number provided by the plurality of multiplexers.

20. The apparatus of claim 1, wherein the plurality of sets of frequency subbands are non-overlapping and are formed with orthogonal frequency division multiplexing (OFDM).

21. An apparatus comprising:
    means for mapping a plurality of slots to a plurality of interlaces with the plurality of slots and the plurality of interlaces being equal in quantity, wherein the plurality of slots correspond to a plurality of transmission units and the plurality of interlaces correspond to a plurality of sets of frequency subbands, and wherein the means for mapping is arranged in at least two stages; and
    means for generating at least one control signal for mapping the plurality of slots to different ones of the plurality of interlaces in different time intervals.

22. The apparatus of claim 21, wherein the plurality of slots comprise at least one pilot slot used for pilot and at least two data slots used for data.

23. The apparatus of claim 22, wherein the means for mapping the plurality of slots to the plurality of interlaces comprises
    means for mapping the at least one pilot slot to at least two interlaces among the plurality of interlaces in different time intervals, and
    means for mapping each of the at least two data slots to different interlaces at varying distances to the at least two interlaces for the pilot slot in different time intervals.

24. The apparatus of claim 21, further comprising:

means for selecting one of a first plurality of buffers based on a slot number; and means for selecting one of a second plurality of buffers based on an interlace number provided by the means for mapping the plurality of slots to the plurality of interlaces.

25. A method comprising:

mapping a plurality of slots to a plurality of interlaces with the plurality of slots and the plurality of interlaces being equal in quantity, wherein the plurality of slots correspond to a plurality of transmission units and the plurality of interlaces correspond to a plurality of sets of frequency subbands, wherein the mapping is performed onto a plurality of multiplexers that are arranged in at least two stages; and generating at least one control signal for mapping the plurality of slots to different ones of the plurality of interlaces in different time intervals.

26. The method of claim 25, wherein the plurality of slots comprise at least one pilot slot used for pilot and at least two data slots used for data.

27. The method of claim 25, wherein the mapping the plurality of slots to the plurality of interlaces comprises mapping the at least one pilot slot to at least two interlaces among the plurality of interlaces in different time intervals, and mapping each of the at least two data slots to different interlaces at varying distances to the at least two interlaces for the pilot slot in different time intervals.

28. The method of claim 25, further comprising:

selecting one of a first plurality of buffers based on a slot number; and selecting one of a second plurality of buffers based on an interlace number provided by the mapping of the plurality of slots to the plurality of interlaces.

29. An apparatus comprising:

a plurality of multiplexers configured to map a plurality of interlaces to a plurality of slots with the plurality of slots and the plurality of interlaces being equal in quantity, wherein the plurality of slots correspond to a plurality of transmission units and the plurality of interlaces correspond to a plurality of sets of frequency subbands, and wherein the plurality of multiplexers are arranged in at least two stages; and a control unit configured to generate at least one control signal for the plurality of multiplexers.

30. The apparatus of claim 29, wherein the plurality of multiplexers are configured to map the plurality of interlaces to different ones of the plurality of slots in different time intervals.

31. The apparatus of claim 29, wherein the control unit is configured to generate a single control signal for each stage of multiplexers among the at least two stages of multiplexers.

32. The apparatus of claim 29, wherein each of the plurality of multiplexers is for one of the plurality of slots, and wherein each multiplexer is configured to receive the plurality of interlaces and to provide different ones of the plurality of interlaces for an associated slot in different time intervals.

33. The apparatus of claim 29, wherein the plurality of multiplexers are configured to receive the plurality of interlaces in a permutated order determined based on a slot-to-interlace mapping scheme.

34. The apparatus of claim 29, further comprising:

a first plurality of buffers for the plurality of interlaces, wherein one of the first plurality of buffers is selected based on an interlace number provided to the control unit; and a second plurality of buffers for the plurality of slots, wherein one of the second plurality of buffers is selected based on a slot number provided by the plurality of multiplexers.

35. The apparatus of claim 29, wherein the plurality of sets of frequency subbands are non-overlapping and are formed with orthogonal frequency division multiplexing (OFDM).

36. An apparatus comprising:

means for mapping a plurality of interlaces to a plurality of slots with the plurality of slots and the plurality of interlaces being equal in quantity, wherein the plurality of slots correspond to a plurality of transmission units and the plurality of interlaces correspond to a plurality of sets of frequency subbands, and wherein the means for mapping is arranged in at least two stages; and means for generating at least one control signal for mapping the plurality of interlaces to different ones of the plurality of slots in different time intervals.

37. The apparatus of claim 36, further comprising:

means for selecting one of a first plurality of buffers based on an interlace number; and means for selecting one of a second plurality of buffers based on a slot number provided by the means for mapping the plurality of interlaces to the plurality of slots.

38. A method comprising:

mapping a plurality of interlaces to a plurality of slots with the plurality of slots and the plurality of interlaces being equal in quantity, wherein the plurality of slots correspond to a plurality of transmission units and the plurality of interlaces correspond to a plurality of sets of frequency subbands, and wherein the mapping is performed onto a plurality of multiplexers that are arranged in at least two stages; and generating at least one control signal for mapping the plurality of interlaces to different ones of the plurality of slots in different time intervals.

39. The method of claim 38, further comprising:

selecting one of a first plurality of buffers based on an interlace number; and selecting one of a second plurality of buffers based on a slot number provided by the mapping of the plurality of interlaces to the plurality of slots.

40. A machine readable medium comprising instructions executable by a processor, the instructions comprising code for:

mapping a plurality of slots to a plurality of interlaces with the plurality of slots and the plurality of interlaces being equal in quantity, wherein the plurality of slots correspond to a plurality of transmission units and the plurality of interlaces correspond to a plurality of sets of frequency subbands, and wherein the mapping is performed onto a plurality of multiplexers that are arranged in at least two stages; and generating at least one control signal for mapping the plurality of slots to different ones of the plurality of interlaces in different time intervals.

41. The machine readable medium of claim 40, wherein the plurality of slots comprise at least one pilot slot used for pilot and at least two data slots used for data.

42. The machine readable medium of claim 40, wherein the code for mapping the plurality of slots to the plurality of interlaces comprises code for mapping the at least one pilot slot to at least two interlaces among the plurality of interlaces in different time intervals, and mapping each of the at least two data slots to different interlaces at varying distances to the at least two interlaces for the pilot slot in different time intervals.

43. The machine readable medium of claim 40, wherein the instructions further comprise code for:

selecting one of a first plurality of buffers based on a slot number; and selecting one of a second plurality of buffers based on an interlace number provided by the mapping of the plurality of slots to the plurality of interlaces.

44. A machine readable medium comprising instructions executable by a processor, the instructions comprising code for:

mapping a plurality of interlaces to a plurality of slots with the plurality of slots and the plurality of interlaces being equal in quantity, wherein the plurality of slots correspond to a plurality of transmission units and the plurality of interlaces correspond to a plurality of sets of frequency subbands, and wherein the mapping is performed onto a plurality of multiplexers that are arranged in at least two stages; and generating at least one control signal for mapping the plurality of interlaces to different ones of the plurality of slots in different time intervals.

45. The machine readable medium of claim 44, wherein the instructions further comprise code for:

selecting one of a first plurality of buffers based on an interlace number; and selecting one of a second plurality of buffers based on a slot number provided by the mapping of the plurality of interlaces to the plurality of slots.

* * * * *